US00RE50655E

(19) United States
(12) Reissued Patent
Nagel et al.

(10) Patent Number: US RE50,655 E
(45) Date of Reissued Patent: *Nov. 4, 2025

(54) APPARATUS AND METHOD FOR GENERATING A BANDWIDTH EXTENDED SIGNAL

(71) Applicant: Fraunhofer-Gesellschaft zur Foerderung der angewandten Forschung e.V., Munich (DE)

(72) Inventors: Frederik Nagel, Nuremberg (DE); Sascha Disch, Fuerth (DE); Max Neuendorf, Nuremberg (DE); Stefan Bayer, Nuremberg (DE); Marc Gayer, Erlangen (DE); Markus Lohwasser, Hersbruck (DE); Nikolaus Rettelbach, Nuremberg (DE); Ulrich Kraemer, Stuttgart (DE)

(73) Assignee: Fraunhofer-Gesellschaft zur Foerderung der angewandten Forschung e.V., Munich (DE)

( * ) Notice: This patent is subject to a terminal disclaimer.

(21) Appl. No.: 18/518,288

(22) Filed: Nov. 22, 2023

Related U.S. Patent Documents

Reissue of:
(64) Patent No.: 8,880,410
Issued: Nov. 4, 2014
Appl. No.: 13/004,314
Filed: Jan. 11, 2011

U.S. Applications:
(63) Continuation of application No. 16/230,764, filed on Dec. 21, 2018, now Pat. No. Re. 49,801, which is a
(Continued)

(51) Int. Cl.
*G10L 19/00* (2013.01)
*G10L 21/038* (2013.01)

(52) U.S. Cl.
CPC ..... *G10L 21/038* (2013.01)

(58) Field of Classification Search
CPC ..... G10L 21/038
See application file for complete search history.

(56) References Cited

U.S. PATENT DOCUMENTS 3,165,707 A * 1/1965 Clapper ..... 331/78
4,645,883 A * 2/1987 Horna et al. ..... 379/406.08
(Continued)

FOREIGN PATENT DOCUMENTS

CN 1272259 11/2000
CN 1272259 A 11/2000
(Continued)

OTHER PUBLICATIONS

"3GPP TS 26.404 Version 2.0.0 Enhanced aacPlus General Audio Codec; Encoder specification; Spectral Band Replication (SBR) part (Release 6)", 3GPP Draft. SP-040636, 3rd Generation Partnership Project (3GPP). vol. TSG #25., Sep. 2, 2004, 35 Pages.
(Continued)

*Primary Examiner* — Ovidio Escalante
(74) *Attorney, Agent, or Firm* — Perkins Coie LLP; Michael A. Glenn

(57) ABSTRACT

An apparatus for generating a bandwidth extended signal from an input signal includes a patch generator and a combiner. The input signal is represented for first and second bands by first and second resolution data, respectively, the second resolution being lower than the first. The patch generator generates first and second patches from the first band of the input signal according to first and second patching algorithms, respectively. A spectral density of the second patch generated using the second patching algorithm is higher than a spectral density of a first patch generated using the first patching algorithm. The combiner combines both patches and the first band of the input signal to obtain the bandwidth extended signal. The apparatus scales the input signal according to the first and second patching
(Continued)

algorithms or scales the first and second patches, so that the bandwidth extended signal fulfills a spectral envelope criterion.

14 Claims, 16 Drawing Sheets

Related U.S. Application Data continuation of application No. 15/341,763, filed on Nov. 2, 2016, now Pat. No. Re. 47,180, which is an application for the reissue of Pat. No. 8,880,410, which is a continuation of application No. PCT/EP2009/004603, filed on Jun. 25, 2009.

(60) Provisional application No. 61/079,849, filed on Jul. 11, 2008.

(56) References Cited

U.S. PATENT DOCUMENTS

| | | | | |
|---|---|---|---|---|
| 4,674,125 | A | 6/1987 | Carlson et al. | |
| 5,455,888 | A | 10/1995 | Iyengar et al. | |
| 6,549,884 | B1 | 4/2003 | Laroche et al. | |
| 6,675,144 | B1 | 1/2004 | Tucker et al. | |
| 7,003,451 | B2 | 2/2006 | Kjorling et al. | |
| 7,734,462 | B2 | 6/2010 | Kabal et al. | |
| 8,355,906 | B2 * | 1/2013 | Kabal et al. | 704/219 |
| 8,447,617 | B2 * | 5/2013 | Rossello et al. | 704/500 |
| 9,412,388 | B1 | 8/2016 | Truman et al. | |
| 2004/0068399 | A1 * | 4/2004 | Ding | G10L 21/038 704/E19.009 |
| 2004/0243402 | A1 | 12/2004 | Ozawa | |
| 2007/0086713 | A1 | 4/2007 | Ingmar et al. | |
| 2007/0106502 | A1 | 5/2007 | Kim et al. | |
| 2007/0124140 | A1 | 5/2007 | Iser et al. | |
| 2007/0150269 | A1 * | 6/2007 | Nongpiur et al. | 704/226 |
| 2007/0282599 | A1 * | 12/2007 | Choo | G10L 21/038 704/205 |
| 2008/0027711 | A1 | 1/2008 | Rajendran et al. | |
| 2008/0120117 | A1 * | 5/2008 | Choo | G10L 21/038 375/240 |
| 2008/0208572 | A1 * | 8/2008 | Nongpiur et al. | 704/205 |
| 2009/0024399 | A1 | 1/2009 | Gartner et al. | |
| 2010/0114583 | A1 * | 5/2010 | Lee et al. | 704/500 |
| 2011/0054885 | A1 | 3/2011 | Nagel et al. | |
| 2011/0112670 | A1 | 5/2011 | Disch et al. | |
| 2012/0027050 | A1 | 2/2012 | Bourdel et al. | |

FOREIGN PATENT DOCUMENTS

| | | | | |
|---|---|---|---|---|
| CN | 1408109 | | 4/2003 | |
| CN | 1408109 | A | 4/2003 | |
| CN | 1550002 | | 11/2004 | |
| CN | 1550002 | A | 11/2004 | |
| CN | 1791902 | | 6/2006 | |
| CN | 1791902 | A | 6/2006 | |
| CN | 101044553 | | 9/2007 | |
| CN | 101044553 | A | 9/2007 | |
| DE | 102008015702 | A1 * | 8/2009 | G10L 21/02 |
| EP | 0945852 | | 9/1999 | |
| RU | 2256293 | | 7/2005 | |
| RU | 2256293 | C2 | 7/2005 | |
| WO | 1998057436 | A2 | 12/1998 | |
| WO | WO 98 57436 | | 12/1998 | |
| WO | WO 00/45379 | | 8/2000 | |
| WO | 2000045379 | A3 | 12/2000 | |
| WO | WO03/010752 | | 2/2003 | |
| WO | 2003019534 | | 6/2003 | |
| WO | WO03/019534 | | 6/2003 | |
| WO | 2004104987 | A1 | 12/2004 | |
| WO | WO-2004104987 | | 12/2004 | |
| WO | 2006046587 | A1 | 5/2006 | |
| WO | WO-2006046587 | | 5/2006 | |

OTHER PUBLICATIONS

Dietz, Martin , et al., "Spectral Band Replication, a Novel Approach in Audio Coding", Engineering Society Convention 121, Audio Engineering Society Paper 5553—May 10, 2002, pp. 1-8.

Robel, A , et al., "Transient Detection and Preservation in the Phase Vocoder", ICMC '03. Singapore. Link provided: citeseer.ist.psu.edu/679246.html, 247-250.

Ziegler , et al., "Enhancing mp3 with SBR: Features and Capabilities of the new mp3PRO Algorithm", AES Convention Paper 5560, Presented at the 112th Convention, Munich, Germany, May 2002, 7 pages.

Laroche, et al., "Improved Phase Vocoder Timescale Modification of Audio", IEEE Trans. Speech and Audio Processing. vol. 7, No. 3. 323-332; May 1999.

Meltzer, et al., "SBR enhanced audio codecs for digital broadcasting such as "Digital Radio Mondiale" (DRM)", AES 112th Convention. Munich, Germany; 4 pages, May 2002.

Nagel, et al., "A Harmonic Bandwidth Extension Method for Audio Codecs", ICASSP International Conference on Acoustics, Speech and Signal Processing. IEEE CNF. Taipei, Taiwan; pp. 145-148; Apr. 19, 2009.

Puckette, et al., "Phase-locked Vocoder", IEEE ASSP Conference on Applications of Signal Processing to Audio and Acoustics. Mohonk, New York, USA; 4 Pages; 1995.

Wolters, et al., "A Closer Look into MPEG-4 High Efficiency AAC", Preprints of Papers Presented at the 115th AES Convention. vol. 115. XP008063876; 6 Pages; Oct. 10, 2003.

Bai, Mingsian R., and Wan-Chi Lin. "Synthesis and implementation of virtual bass system with a phase-vocoder approach." Journal of the Audio Engineering Society 54.11 (2006): 1077-1091.*

Dietz, Martin, et al. "Spectral Band Replication, a novel approach in audio coding." Audio Engineering Society Convention 112. Audio Engineering Society, 2002.*

PCT/EP2009/004603 International Search Report and Written Opinion; 13 pages; Sep. 11, 2009.

Dietz M et al: "Spectral Band Replication, a Novel Approach in Audio Coding" Audio Engineering Society Convention Paper, New York, NY, US, vol. 112, No. 5553, May 10, 2002, pp. 1-08, XP009020921 cited in the application: p. 4 left-hand column, 2nd paragraph p. 4 right-hand column, last paragraph-p. 5 left hand column, last paragraph Figure 9, abstract, figure 7.

S. Meltzer, R. Böhm and F. Henn, "SBR enhanced audio codecs for digital broadcasting Digital Radio Mondiale (DRM)," 112th AES Convention, Munich, May 2002; T. Ziegler.

Ehret, P. Ekstrand and M. Lutzky, "Enhancing mp3 with SBR: Features and Capabilities of the new mp3PRO Algorithm," in 112th AES Convention, Munich, May 2002; International Standard ISO/IEC 14496-3:2001/FPDAM I, "Bandwidth Extension," ISO/IEC, 2002.

Frederik Nagel and Sascha Disch, A Harmonic Bandwidth Extension Method for Audio Codecs, ICASSP '09.

Röbel, A.: Transient detection and preservation in the phase vocoder; citeseer.ist.psu.edu/679246.html.

TSG-SA WG4: "3GPP TS 26.404 version 2.0.0 Enhanced aacPlus General Audio Codec; Encoder specification; Spectral Band Replication (SBR) part (Release 6)" 3GPP Draft; SP-040636, 3rd Generation Partnership Project (3GPP), Mobile Competence Centre; 650, Route Des Lucioles; F-06921 Sophis-Antipolis Cedex; France, vol. TSG SA, no. Palm Springs, CA, USA; Sep. 2, 2004, XP050202963.

* cited by examiner (filterbank implementation)

(transformation implementation)

APPARATUS AND METHOD FOR GENERATING A BANDWIDTH EXTENDED SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application is a continuation of copending International Application No. PCT/EP2009/004603 filed Jun. 25, 2009, and also claims priority to U.S. Application No. 61/079,849, filed Jul. 11, 2008, which is incorporated herein by reference in its entirety.]

[Embodiments according to the invention relate to audio signal processing and, in particular, to an apparatus and a method for generating a bandwidth extended signal from an input signal, an apparatus and a method for providing a bandwidth reduced signal based on an input signal and an audio signal.]

*Notice: More than one reissue application has been filed for the reissue of U.S. Pat. No. 8,880,410, the first being reissue application Ser. No. 18/518,193. Additionally, reissue application Ser. Nos. 18/518,223, 18/518,246, 18/518,261, 18/518,288, 18/518,309, 18/518,326, 18/518,339, were filed, all of which are continuation reissues of U.S. Pat. No. 8,880,410.*

*This application Ser. No. 18/518,288, filed Nov. 22, 2023 is a continuation reissue application of U.S. patent application Ser. No. 16/230,764 filed Dec. 21, 2018 and also a reissue of U.S. patent application Ser. No. 13/004,314, issued as U.S. Pat. No. 8,880,410 on Nov. 4, 2014 and U.S. patent application Ser. No. 16/230,764 is a continuation of reissue Ser. No. 15/341,763 filed Nov. 2, 2016, issued U.S. Pat. No. RE47,180 on Dec. 25, 2018, which is a reissue of U.S. patent application Ser. No. 13/004,314, issued as U.S. Pat. No. 8,880,410 which is a continuation of copending International Application No. PCT/EP2009/004603 filed Jun. 25, 2009, and also claims priority to U.S. application Ser. No. 61/079,849, filed Jul. 11, 2008, which is incorporated herein by reference in its entirety.*

BACKGROUND OF THE INVENTION

Perceptually adapted coding of audio signals, providing a substantial data rate reduction for efficient storage and transmission of these signals, has gained wide acceptance in many fields. Many coding algorithms are known, e.g., MPEG 1/2 Layer 3 ("MP3") or MPEG 4 AAC (Advanced Audio Coding). However, the coding used for this, in particular when operating at lowest bit rates, can lead to an reduction of subjective audio quality which is often mainly caused by an encoder side induced limitation of the audio signal bandwidth to be transmitted.

It is known from WO 98 57436 to subject the audio signal to a band limiting in such a situation on the encoder side and to encode only a lower band of the audio signal by means of a high quality audio encoder ("core coder"). The upper band, however, is only very coarsely characterized, i.e. by a set of parameters which reproduces the spectral envelope of the upper band. On the decoder side, the upper band is then synthesized. For this purpose, a harmonic transposition is proposed wherein the lower band of the decoded audio signal is supplied to a filterbank. Filterbank channels of the lower band are connected to filterbank channels of the upper band, or are "patched", and each patched bandpass signal is subjected to an envelope adjustment. The synthesis filterbank belonging to a special analysis filterbank receives bandpass signals of the audio signal in the lower band and envelope-adjusted bandpass signals of the lower band which are harmonically patched into the upper band. The output signal of the synthesis filterbank is an audio signal extended with regard to its original bandwidth which is transmitted from the encoder side to the decoder side by the core coder operating a very low data rate. In particular, filterbank calculations and patching in the filterbank domain may become a high computational effort.

Complexity-reduced methods for a bandwidth extension of band-limited audio signals instead use a copying function of low-frequency signal portions (LF) into the high frequency range (HF) in order to approximate information missing due to the band limitation. Such methods are described in M. Dietz, L. Liljeryd, K. Kjörling and O. Kunz, "Spectral Band Replication, a novel approach in audio coding," in 112th AES Convention, Munich, May 2002; S. Meltzer, R. Böhm and F. Henn, "SBR enhanced audio codecs for digital broadcasting such as "Digital Radio Mondiale" (DRM)," 112th AES Convention, Munich, May 2002; T. Ziegler, A. Ehret, P. Ekstrand and M. Lutzky, "Enhancing mp3 with SBR: Features and Capabilities of the new mp3PRO Algorithm," in 112th AES Convention, Munich, May 2002; International Standard ISO/IEC 14496-3:2001/FPDAM 1, "Bandwidth Extension," ISO/IEC, 2002, or "Speech bandwidth extension method and apparatus", Vasu Iyengar et al. U.S. Pat. No. 5,455,888.

In these methods, no harmonic transposition is performed, but successive bandpass signals of the lower band are introduced into successive filterbank channels of the upper band. By this, a coarse approximation of the upper band of the audio signal is achieved. In a further step, this coarse approximation of the signal is then assimilated with respect to the original by a post processing using control information gained from the original signal. Here, e.g. scale factors serve for adapting the spectral envelope, an inverse filtering, and the addition of a noise floor for adapting tonality and a supplementation of sinusoidal signal portions for missing harmonics, as it is also described in the MPEG-4 High Efficiency Advanced Audio Coding (HE-AAC) standard.

Apart from this, further methods are using a phase vocoder for bandwidth extension. When applying the phase vocoder for spectral spreading, frequency lines move further apart from each other. If gaps exist in the spectrum, e.g. by quantization, the same are even increased by the spreading. In an energy adaption, remaining lines in the spectrum receive too much energy compared to the respective lines in the original signal.

FIG. 13 shows a schematic illustration of a bandwidth extension 1300 using a phase vocoder. In this example, two patches 1312, 1314 are added to a low frequency band 1302 of a signal. The upper cut-off frequency 1320 of the signal, also called Xover frequency (crossover frequency) is the low-end frequency of the neighboring patch 1312 and the double of the x-over frequency is the upper cut-off frequency of the neighboring patch 1312 and the lower cut-off frequency of the next patch 1314. The phase vocoder doubles the frequency of the frequency lines of the low frequency band 1302 of the signal to obtain the neighboring patch 1312 and triples the frequencies of the frequency lines of the low frequency band 1302 of the signal to obtain the next patch 1314. Therefore, a spectral density of the neighboring patch 1312 is only half of a spectral density of the low frequency band 1302 of the signal and the spectral density of the next patch 1314 is only one third of the spectral density of the low frequency band 1302 of the signal.

By the concentration of the energy in bands (patches) to only few frequency lines, a substantial change in timbre results which differs from the original. The energy of formerly more bands (frequency lines) is summed up to the fewer remaining ones.

Some examples for phase vocoders and their applications are presented in "Frederik Nagel and Sascha Disch, A Harmonic Bandwidth Extension Method for Audio Codecs," ICASSP'09 and "M. Puckette. Phase-locked Vocoder. IEEE ASSP Conference on Applications of Signal Processing to Audio and Acoustics, Mohonk 1995.", Röbel, A.: Transient detection and preservation in the phase vocoder; citeseer.ist.psu.edu/679246.html", "Laroche L., Dolson M.: Improved phase vocoder timescale modification of audio", IEEE Trans. Speech and Audio Processing, Vol. 7, No. 3, pp. 323-332" and U.S. Pat. No. 6,549,884.

One approach for filling the gaps is shown in WO 00/45379. It contains a method and an apparatus for enhancement of source coding systems utilizing high frequency reconstruction. The application addresses the problem of insufficient noise contents in a reconstructed high-band by adaptive noise-floor addition. Adding noise may fill the gaps, but the audio quality or subjective quality may not be increased sufficiently.

SUMMARY

According to an embodiment, an apparatus for generating a bandwidth extended signal from an input signal, wherein the input signal is represented, for a first band by a first resolution data, and for a second band by a second resolution data, the second resolution being lower than the first resolution, may have: a patch generator configured to generate a first patch from the first band of the input signal according to a first patching algorithm and configured to generate a second patch from the first band of the input signal according to a second patching algorithm, wherein a spectral density of the second patch generated according to the second patching algorithm is higher than a spectral density of the first patch generated according to the first patching algorithm; and a combiner configured to combine the first patch, the second patch and the first band of the input signal to acquire the bandwidth extended signal, wherein the apparatus for generating a bandwidth extended signal is configured to scale the input signal according to the first patching algorithm and according to the second patching algorithm or to scale the first patch and the second patch, so that the bandwidth extended signal fulfills a spectral envelope criterion.

According to another embodiment, an apparatus for providing a bandwidth reduced signal based on an input signal may have: a spectral envelope data determiner configured to determine spectral envelope data based on a high-frequency band of the input signal; a patch scaling control data generator configured to generate patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data wherein the first patch is generated from a first band of the bandwidth reduced signal according to a first patching algorithm and the second patch is generated from the first band of the bandwidth reduced signal according to a second patching algorithm, wherein a spectral density of the second patch generated according to the second patching algorithm is higher than a spectral density of the first patch generated according to the first patching algorithm; an output interface configured to combine a low frequency band of the input signal, the spectral envelope data and the patch scaling control data to acquire the bandwidth reduced signal and configured to provide the bandwidth reduced signal for transmission or storage.

According to another embodiment, an audio signal may have: a first band represented by a first resolution data; and a second band represented by a second resolution data, wherein the second resolution is lower than the first resolution, wherein the second resolution data is based on spectral envelope data of the second band and is based on patch scaling control data of the second band for scaling the audio signal at a decoder or for scaling a first patch and a second patch by the decoder, so that a bandwidth extended signal generated by the decoder fulfills a spectral envelope criterion, wherein the spectral envelope criterion is based on the spectral envelope data, wherein the first patch is generated from the first band of the audio signal according to a first patching algorithm and the second patch is generated from the first band of the audio signal according to a second patching algorithm, wherein a spectral density of the second patch generated according to the second patching algorithm is higher than a spectral density of the first patch generated according to the first patching algorithm.

According to another embodiment, a method for generating a bandwidth extended signal from an input signal, wherein the input signal is represented, for a first band by a first resolution data, and for a second band by a second resolution data, the second resolution being lower than the first resolution, may have the steps of: generating a first patch from the first band of the input signal according to a first patching algorithm; generating a second patch from the first band of the input signal according to a second patching algorithm, wherein a spectral density of the second patch generated according to the second patching algorithm is higher than a spectral density of the first patch generated according to the first patching algorithm; scaling the input signal according to the first patching algorithm and according to the second patching algorithm or scaling the first patch and the second patch, so that the bandwidth extended signal fulfills the spectral envelope criterion; and combining the first patch, the second patch and the first band of the input signal to acquire the bandwidth extended signal.

According to another embodiment, a method for providing a bandwidth reduced signal based on an input signal, may have the steps of: determining a spectral envelope data based on a high frequency band of the input signal; generating patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data, wherein the first patch is generated from a first band of the bandwidth reduced signal according to a first patching algorithm and a second patch is generated from the first band of the bandwidth reduced signal according to a second patching algorithm, wherein a spectral density of the second patch generated according to the second patching algorithm is higher than a spectral density of the first patch generated according to the first patching algorithm; combining a low frequency band of the input signal, the spectral envelope data and the patch scaling control data to acquire the bandwidth reduced signal; providing the bandwidth reduced signal for a transmission or storage.

Another embodiment may have a computer program with a program code for performing the method for generating a bandwidth extended signal from an input signal, wherein the input signal is represented, for a first band by a first resolution data, and for a second band by a second resolution data, the second resolution being lower than the first resolution, which method may have the steps of: generating a first patch from the first band of the input signal according to a first patching algorithm; generating a second patch from the first band of the input signal according to a second patching algorithm, wherein a spectral density of the second patch generated according to the second patching algorithm is higher than a spectral density of the first patch generated according to the first patching algorithm; scaling the input signal according to the first patching algorithm and according to the second patching algorithm or scaling the first patch and the second patch, so that the bandwidth extended signal fulfills the spectral envelope criterion; and combining the first patch, the second patch and the first band of the input signal to acquire the bandwidth extended signal, when the computer program runs on a computer or a microcontroller.

Another embodiment may have a computer program with a program code for performing the method for providing a bandwidth reduced signal based on an input signal, which method may have the steps of: determining a spectral envelope data based on a high frequency band of the input signal; generating patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data, wherein the first patch is generated from a first band of the bandwidth reduced signal according to a first patching algorithm and a second patch is generated from the first band of the bandwidth reduced signal according to a second patching algorithm, wherein a spectral density of the second patch generated according to the second patching algorithm is higher than a spectral density of the first patch generated according to the first patching algorithm; combining a low frequency band of the input signal, the spectral envelope data and the patch scaling control data to acquire the bandwidth reduced signal; providing the bandwidth reduced signal for a transmission or storage, when the computer program runs on a computer or a microcontroller.

An embodiment of the invention provides an apparatus for generating a bandwidth extended signal from an input signal. The input signal is represented, for a first band by a first resolution data and for a second band by a second resolution data, the second resolution being lower than the first resolution. The apparatus comprises a patch generator and a combiner. The patch generator is configured to generate a first patch from the first band of the input signal according to a first patching algorithm and configured to generate a second patch from the first band of the input signal according to a second patching algorithm. A spectral density of the second patch generated according to the second patching algorithm is higher than a spectral density of the first patch generated according to the first patching algorithm. The combiner is configured to combine the first patch, the second patch and the first band of the input signal to obtain the bandwidth extended signal. The apparatus for generating a bandwidth extended signal is configured to scale the input signal according to the first patching algorithm and according to the second patching algorithm or to scale the first patch and the second patch, so that the bandwidth extended signal fulfils a spectral envelope criterion.

Embodiments according to the present invention are based on the central idea that a patch with low spectral density (which means, for example, the patch comprises gaps in comparison to a low frequency band of the input signal) is combined with a patch with high spectral density (which means, for example, the patch comprises only few gaps or no gaps in comparison with the low frequency band of the input signal) for extending the bandwidth of an input signal. Since both patches are generated based on the input signal, the high frequency bandwidth extension of the low frequency band of the input signal may provide a good approximation of the original audio signal. Additionally, the first and the second patch may be scaled before (by scaling the input signal) or after generation to fulfill a spectral envelope criterion, since the spectral envelope of the original audio signal should be considered for the reconstruction of the high frequency band of the input signal. In this way, the subjective quality or the audio quality of the bandwidth extended signal may be significantly increased.

In some embodiments according to the invention, the first patching algorithm is a harmonic patching algorithm. In other words, the first patch is generated so that only frequencies that are integer multiples of frequencies of the first band of the input signal are contained by the first patch. In addition, the second patching algorithm may be a mixing patching algorithm. This means, for example, that the second patch may be generated, so that the second patch contains frequencies that are integer multiples of frequencies of the first band of the input signal and frequencies that are not integer multiples of frequencies of the first band of the input signal. Therefore, the spectral density of the second patch is higher than the spectral density of the first patch. By combining the first patch and the second patch, missing frequency lines of the first patch may be filled by frequency lines of the second patch. In this way, the gaps of the harmonic bandwidth extension according to the first patching algorithm may be filled by the second patch and the audio quality of the bandwidth extended signal may be significantly improved.

Some embodiments according to the invention relate to an apparatus for providing a bandwidth reduced signal based on an input signal. The apparatus comprises a spectral envelope data determiner, a patch scaling control data generator, and an output interface. The spectral envelope data determiner is configured to determine spectral envelope data based on the high frequency band of the input signal. The patch scaling control data generator is configured to generate patch scaling control data for scaling the bandwidth reduced signal at the decoder or for scaling a first patch and a second patch by the decoder, so that a bandwidth extended signal generated by the decoder fulfills a spectral envelope criterion. The spectral envelope criterion is based on the spectral envelope data. The first patch is generated from a low frequency band of the bandwidth reduced signal according to a first patch algorithm and the second patch is generated from the low frequency band of the bandwidth reduced signal according to a second patching algorithm. A spectral density of the second patch generated according to the second patching algorithm is higher than a spectral density of the first patch generated according to the first patching algorithm. The output interface is configured to combine a low frequency band of the input signal, the spectral envelope data, and the power scaling control data to obtain the bandwidth reduced signal. Further, the output interface is configured to provide the bandwidth reduced signal for transmission or storage.

Some further embodiments according to the invention relate to an audio signal comprising a first band and a second band. The first band is represented by a first resolution data and the second band is represented by a second resolution data. The second resolution is lower than the first resolution. The second resolution data is based on spectral envelope data of the second band and patch-scaling control data of the second band for scaling the audio signal at a decoder or for scaling a first patch and a second patch by the decoder, so that a bandwidth extended signal generated by the decoder fulfills a spectral envelope criterion. The spectral envelope criterion is based on the spectral envelope data. The first patch is generated from the first band of the audio signal according to a first patching algorithm and the second patch is generated from the first band of the audio signal according to a second patching algorithm. A spectral density of the second patch generated according to the second patching algorithm is higher than a spectral density of the first patch generator according to the first patching algorithm.

BRIEF DESCRIPTION OF THE DRAWINGS

Embodiments of the present invention will be detailed subsequently referring to the appended drawings, in which:

FIG. 5b is a detailed illustration of a filter of FIG. 5a;

FIG. 5c is a schematic illustration for the manipulation of the magnitude signal and the frequency signal in a filter channel of FIG. 5a;

DETAILED DESCRIPTION OF THE INVENTION

Figure 1:
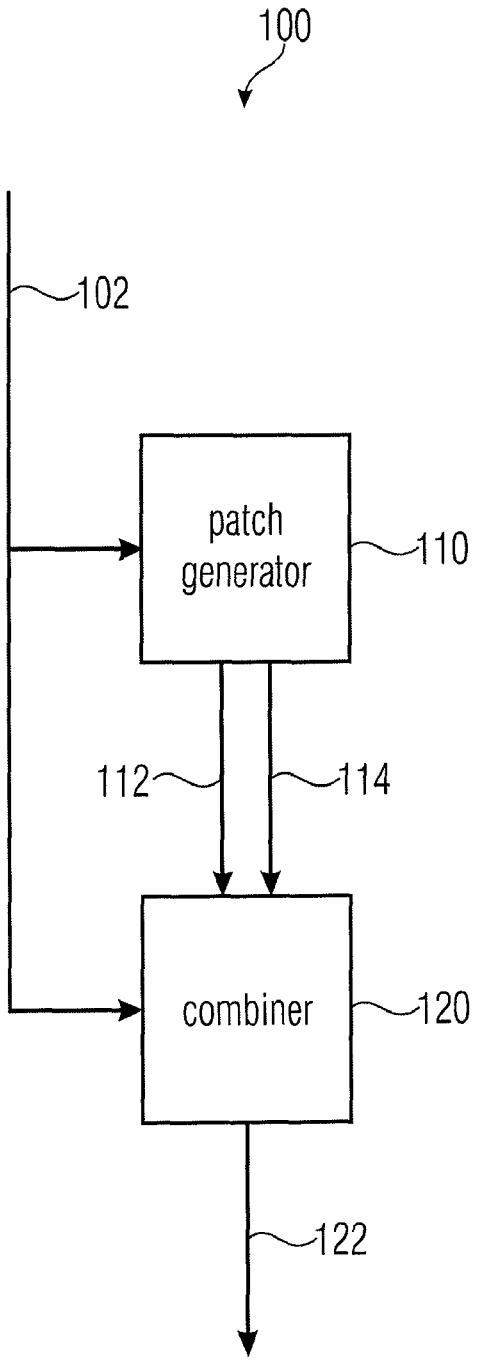
FIG. 1 is a block diagram of an apparatus for generating a bandwidth extended signal from an input signal.

In the following, the same reference numerals are partly used for objects and functional units having the same or similar functional properties and the description thereof with regard to a figure shall apply also to other figures in order to reduce redundancy in the description of the embodiments.

FIG. 1 shows a block diagram of an apparatus 100 for generating a bandwidth extended signal 122 for an input signal 102 according to an embodiment of the invention. The input signal 102 is represented, for a first band by a first resolution data, and for a second band by a second resolution data, the second resolution being lower than the first resolution. The apparatus 100 comprises a patch generator 110 connected to a combiner 120. The patch generator 120 generates a first patch 112 from the first band of the input signal 102 according to a first patching algorithm and generates a second patch 114 from the first band of the input signal 102 according to a second patching algorithm. A spectral density of the second patch 114 generated according to the second patching algorithm is higher than a spectral density of the first patch 112 generated according to the first patching algorithm. The combiner 120 combines the first patch 112, the second patch 114 and the first band of the input signal 102 to obtain the bandwidth extended signal 122. Further, the apparatus 100 for generating a bandwidth extended signal 122 scales the input signal 102 according to the first patching algorithm and according to the second patching algorithm or scales the first patch 112 and the second patch 114 so that the bandwidth extended signal 122 fulfills a spectral envelope criterion.

Spectral density means, for example, the density of different frequencies or frequency lines within a frequency band. For example, a frequency band reaching from 0 Hz to 10 kHz comprising frequency portions with frequencies of 4 kHz and 8 kHz has a lower spectral density than the same frequency band comprising frequency portions with frequencies of 2 kHz, 4 kHz, 6 kHz, 8 kHz and 10 kHz. Since the spectral density of the first patch 112 is lower than the spectral density of the second patch 114, the first patch 112 comprises gaps in comparison with the second patch 114. Therefore, the second patch 114 may be used to fill these gaps. Since both patches are based on the first band of the input signal 102, both patches are related to the characteristic of the original signal corresponding to the input signal 102. Therefore, the bandwidth extended signal 122 may be a good approximation of the original signal and the subjective quality or the audio quality of the bandwidth extension signal 122 may be significantly improved by using the described concept. In this way, more energy may be distributed between the remaining lines and, for example, a unnatural sound may be avoided.

For example, the first patching algorithm may be a harmonic patching algorithm. Therefore, the patch generator 110 may generate the first patch 112 comprising only frequencies that are integer multiples of frequencies of the first band of the input signal 102. A harmonic bandwidth extension may provide a good approximation of the tonal structure of the original signal, but this patching algorithm will leave gaps between the harmonic frequencies. These gaps may be filled by the second patch. For example, the second patching algorithm may be a mixing patching algorithm, which means that the patch generator 110 may generate the second patch 114 comprising integer multiples of frequencies of the first band of the input signal 102 (harmonic frequencies) and frequencies that are not integer multiples of the frequencies of the first band of the input signal 102 (non-harmonic frequencies). The non-harmonic frequencies may be used for filling the gaps of the first patch 112. It may also be possible to combine the whole second patch 114 (including the harmonic frequencies) with the first patch 112. In this example, an amplification of the harmonic frequencies due to the combination of the harmonic frequency portions of the first patch 112 and the second patch 114 may be taken into account by appropriately scaling the first patch 112 and/or the second patch 114.

The first patch 112 and the second patch 114 comprise at least partly the same frequency range. For example, the first patch 112 comprises a frequency band reaching from 4 kHz to 8 kHz and the second patch 114 comprises a frequency band from 6 kHz to 10 kHz. In some embodiments according to the invention, a lower cut of frequency of the first patch is equal to a lower cut of frequency of the second patch and an upper cut of frequency of the first patch 112 is equal to an upper cut of frequency of the second patch 114. For example, both patches comprise a frequency band reaching from 4 kHz to 8 kHz.

Figure 2A:
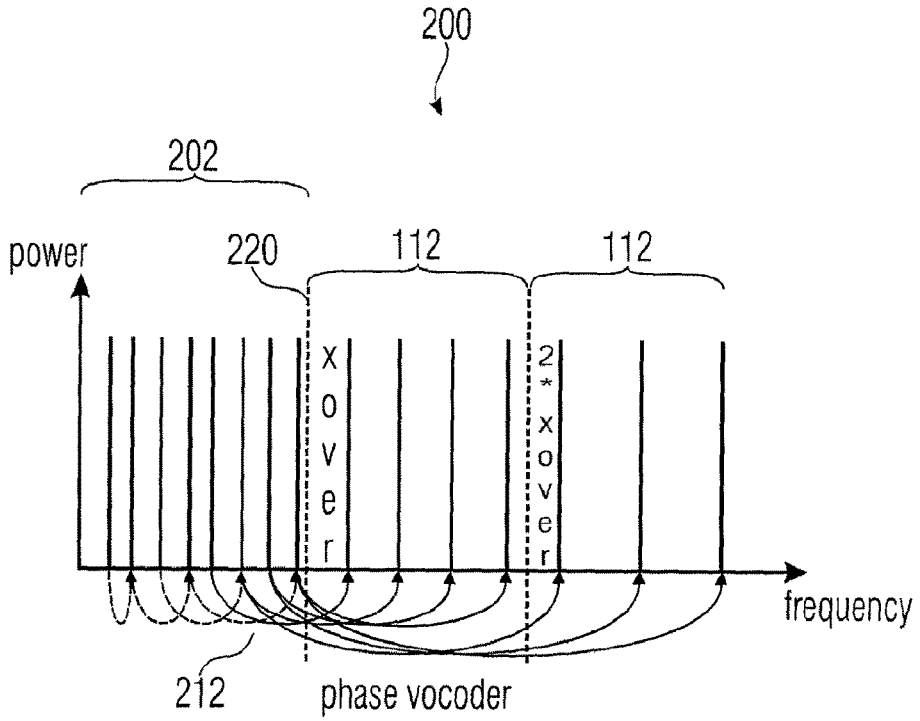
FIG. 2a is a schematic illustration of a generated first patch.
Figure 2B:
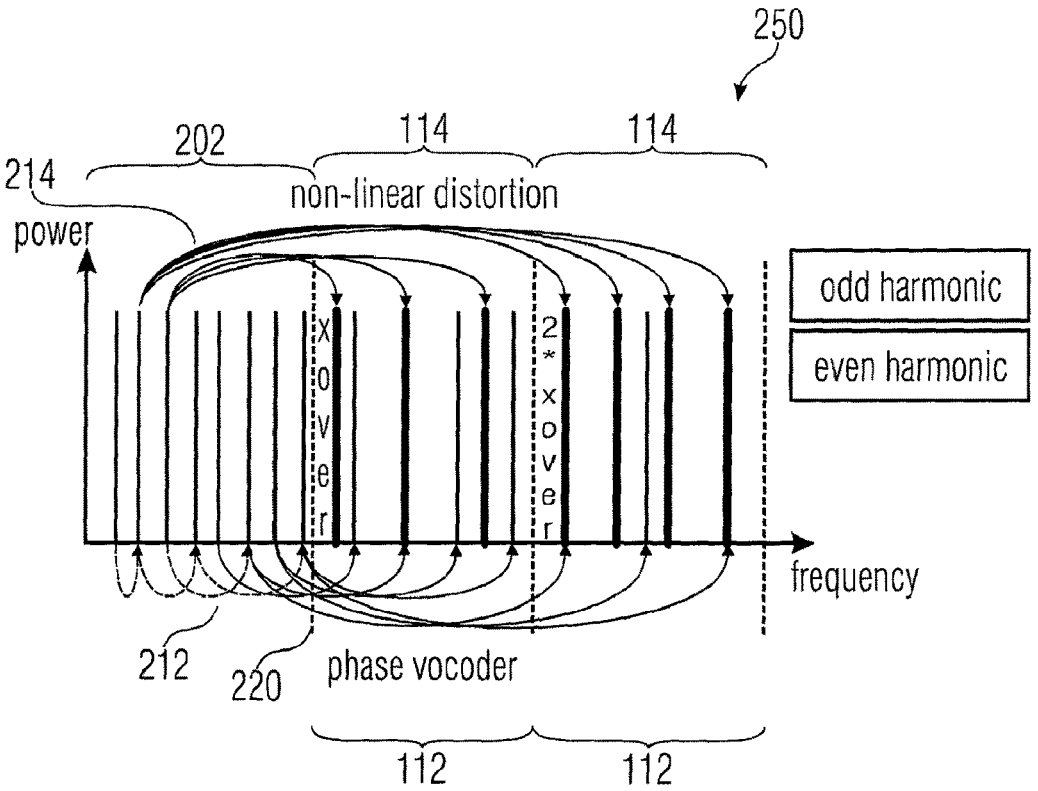
FIG. 2b is a schematic illustration of a generated first and second patch.

FIGS. 2a and 2b show an example for a first patch 112 according to a first patching algorithm 212 and a second patch 114 according to a second patching algorithm 214. For better illustration, FIG. 2a shows only the first patches 112 and FIG. 2b shows the first patches 112 and the corresponding second patches 114. FIG. 2a illustrates an example 200 for the first band 202 of the input signal 102 and two first patches 112 generated according to the first patching algorithm 212. In this example, a patch comprises the same bandwidth as the first band 202 of the input signal 102. The bandwidth may also be different. The upper cut-off frequency 220 of the first band 202 of the input signal 102 is denoted 'Xover' frequency (crossover frequency). In the example shown in FIG. 2a, patches start at a frequency equal to a multiple of the crossover frequency Xover 220. The frequency lines within the first patches 112 are integer multiples of the frequency lines of the first band 202 of the input signal 102 and may, for example, be generated by a phase vocoder. These first patches 112 comprise gaps in terms of missing frequency lines in comparison to the first band 202 of the input signal 102.

FIG. 2b additionally shows an example 250 for the two corresponding second patches 114. These patches are generated according to the second patching algorithm 214 and comprise harmonic and non-harmonic frequencies. The non-harmonic frequency lines may be used to fill the gaps of the first patches 112. The frequency lines of the second patches 114 may be generated, for example, by a non-linear distortion.

In this way, the gaps may not be filled arbitrarily as, for example, by filling the gaps with noise. The gaps are filled based on the first resolution data of the first band of the input signal and, therefore, based on the original signal.

The first band of the input signal 102 may represent, for example, the low frequency band of an original audio signal encoded with high resolution. The second band of the input signal 102 may represent, for example, a high frequency band of the original audio signal and may be quantized by one or more parameters as, for example, spectral envelope data, noise data and/or missing harmonic data with low resolution. An original audio signal may be, for example, an audio signal recorded by a microphone before processing or encoding.

Scaling the input signal according to the first patching algorithm and according to the second patching algorithm means, for example, that the input signal is scaled once according to the first patching algorithm before the first patch is generated and then the first patch is generated based on the scaled input signal, and that the input signal is scaled once according to the second patching algorithm before the second patch is generated and then the second patch is generated based on the scaled input signal, so that after the combination of the first patch, the second patch and the first band of the input signal, the bandwidth extended signal fulfills a spectral envelope criterion. Alternatively, the first patch and the second patch are scaled after their generation, so that the bandwidth extended signal also fulfills a spectral envelope criterion. Also a scaling of the input signal according to the first patching algorithm and according to the second patching algorithm in combination with a scaling of the first patch and the second patch may be possible.

The combiner 120 may be, for example, an adder and the bandwidth extended signal 122 may be a weighted sum of the first patch 112, the second patch 114 and the first band of the input signal 102.

Fulfilling a spectral envelope criterion means, for example, that a spectral envelope of the bandwidth extended signal is based on a spectral envelope data contained by the input signal. The spectral envelope data may be generated by an encoder and may represent the second band of an original signal. In this way, the spectral envelope of the bandwidth extended signal may be a good approximation of the spectral envelope of the original signal.

The apparatus 100 may also comprise a core decoder for decoding the first band of the input signal 102.

The patch generator 110 and the combiner 120 may be, or example, specially designed hardware or part of a processor or micro controller or may be a computer program configured to run on a computer or a micro controller. The apparatus 100 may be part of a decoder or an audio decoder.

Figure 3A:
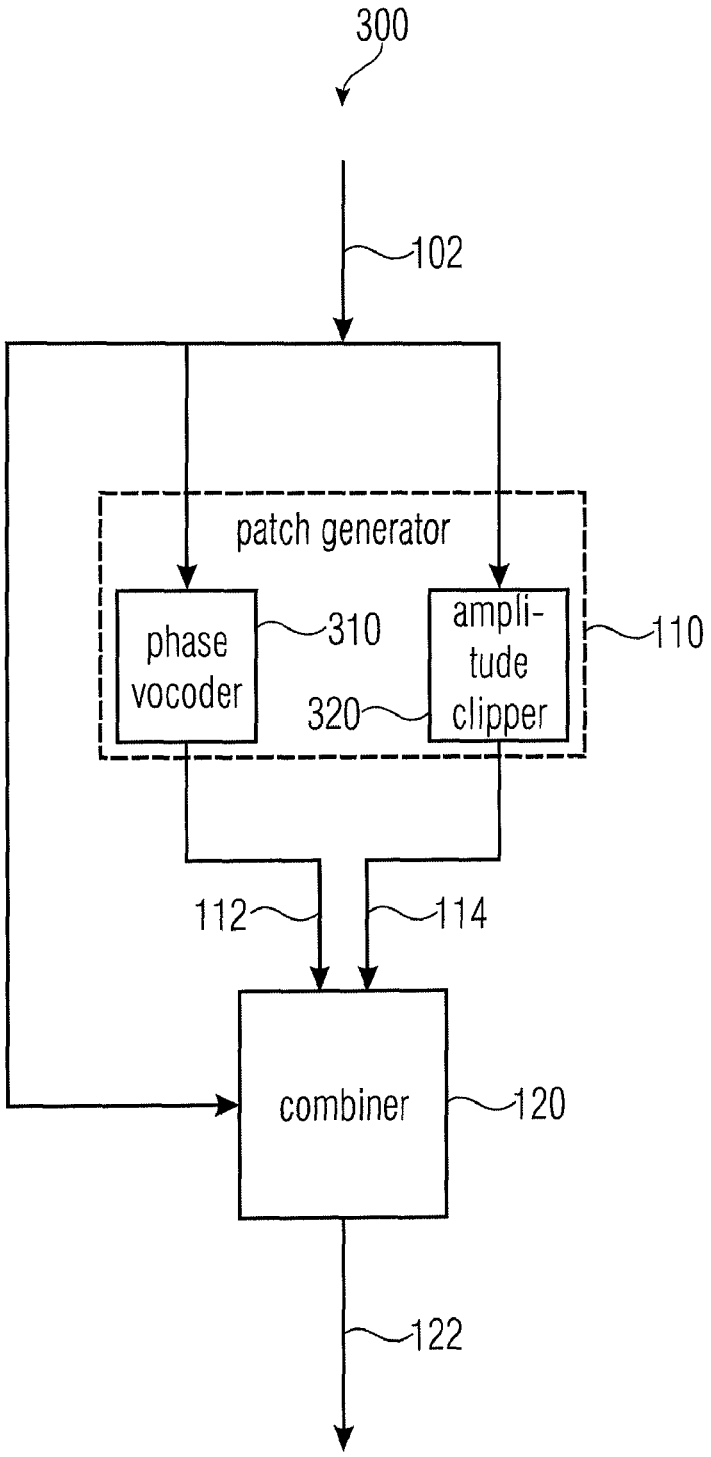
FIG. 3a is a block diagram of an apparatus for generating a bandwidth extended signal from an input signal.

FIG. 3a shows a block diagram of an apparatus 300 for generating a bandwidth extended signal 122 from an input signal 102 according to an embodiment of the invention. In this example, the patch generator 110 comprises a phase vocoder 310 for generating the first patch and an amplitude clipper 320 for generating the second patch 114. The phase vocoder 310 and the amplitude clipper 320 are connected to the combiner 120. The phase vocoder 310 may spread the first band of the input audio signal 102 to generate the first patch 112 comprising harmonic frequencies. In a non-linear processing step, the amplitude clipper 320 may clip the input signal 102 to generate the second patch 114 comprising harmonic and non-harmonic frequencies. Alternatively to the amplitude clipper 320, also a half-wave rectifier, a full-wave rectifier, a mixer or a diode used in the quadratic region of the characteristic curve may be used to generate non-harmonic frequencies based on the input signal 102 by a non-linear processing step.

Figure 3B:
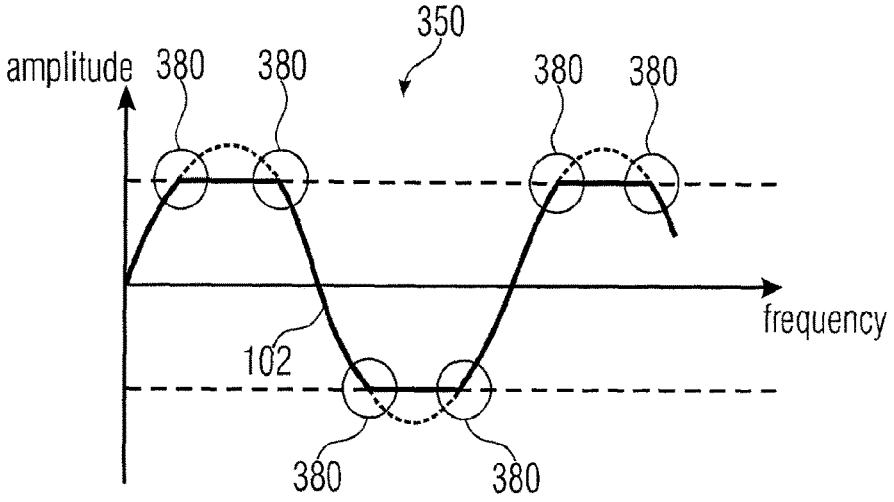
FIG. 3b is a schematic illustration of a clipped sinusoidal input signal.
Figure 3C:
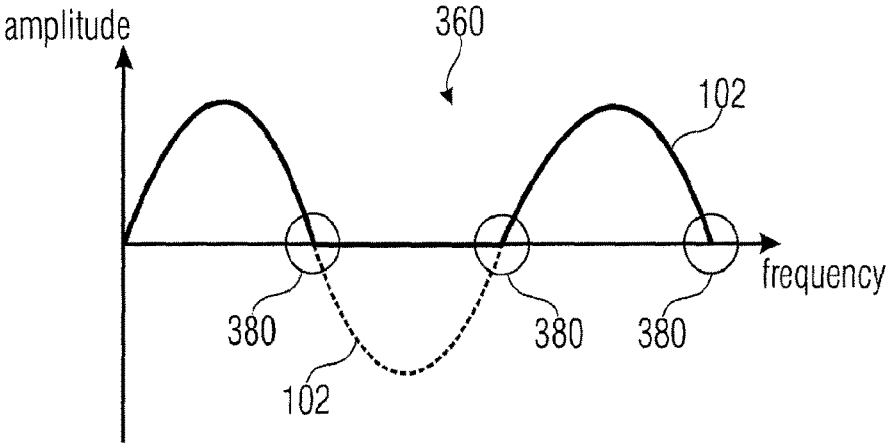
FIG. 3c is a schematic illustration of a half wave rectified sinusoidal input signal.
Figure 3D:
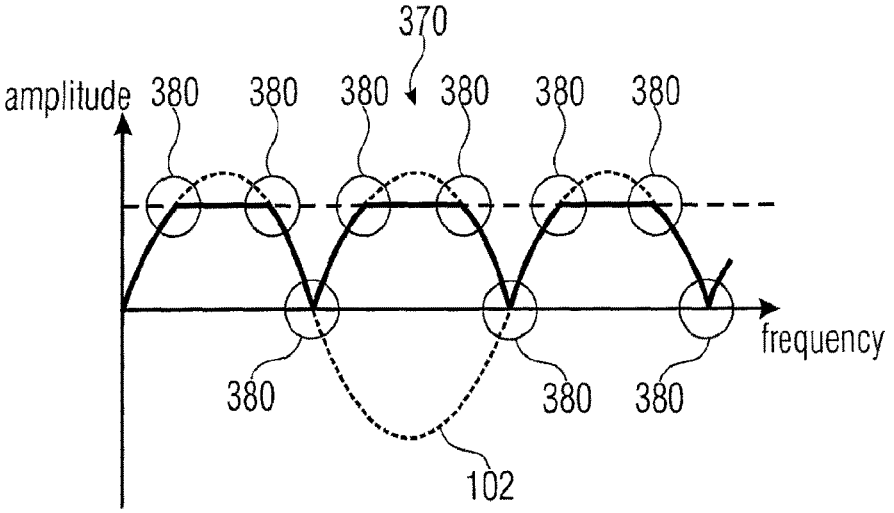
FIG. 3d is a schematic illustration of a clipped and full wave rectified sinusoidal input signal.

FIGS. 3b, 3c and 3d show examples for clipped and/or rectified input signals 102 to generate non-harmonic frequencies. FIG. 3b shows a schematic illustration 350 of a clipped sinusoidal input signal 102. By clipping the signal, points of discontinuity in the form of abrupt changes of the signal slope 380 are caused and harmonic and non-harmonic portions with higher frequencies are generated.

Alternatively, FIG. 3c shows a schematic illustration 360 of a half-wave rectified sinusoidal input signal 102, also causing points of discontinuity 380.

Further, a combination of clipping and rectifying may be possible. FIG. 3d shows a schematic illustration 370 of a clipped and full-wave rectified sinusoidal input signal 102 causing different points of discontinuity 380.

By clipping and/or rectifying or applying other methods of nonlinear processing generating points of discontinuity 380, a wide spectrum of different frequencies may be generated. Therefore, a patch generated according to such a patching algorithm may comprise a high spectral density.

Figure 4:
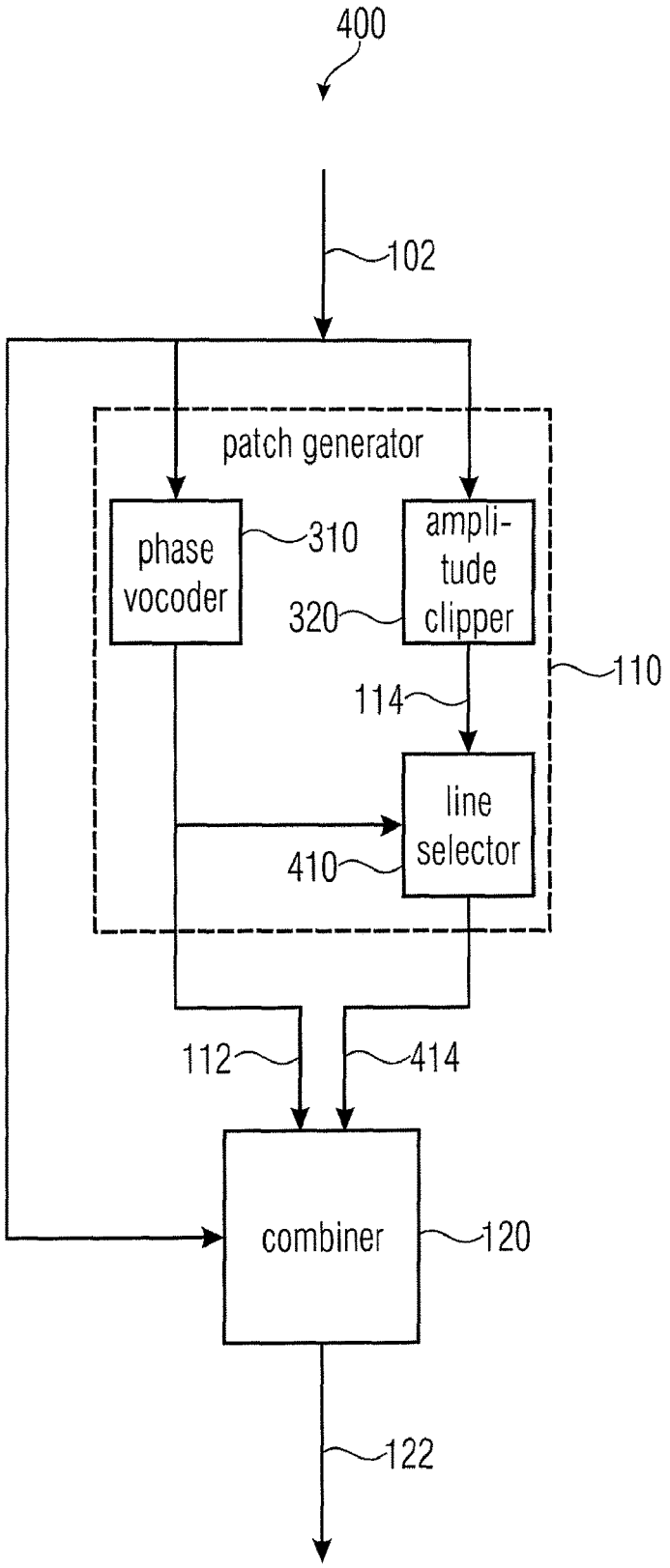
FIG. 4 is a block diagram of an apparatus for generating a bandwidth extended signal from an input signal.

FIG. 4 shows a block diagram of an apparatus 400 for generating a bandwidth extended signal 122 from an input signal 102 according to an embodiment of the invention. The apparatus 400 is similar to the apparatus shown in FIG. 3a, but additionally comprises a spectral line selector 410. The phase vocoder 310 and the amplitude clipper 320 are connected to the spectral line selector 410 and the spectral line selector 410 is connected to the combiner 120. The spectral line selector 410 may select a plurality of frequency lines of the second patch 114 to obtain a modified second patch 414 that may be complementary to the first patch. A frequency line of the second patch 114 may be selected if a corresponding frequency line of the first patch 112 is missing. In other words, the spectral line selector 410 selects frequency lines of the second patch 114 for filling gaps of the first patch 112 and may disregard frequencies of the second patch 114 already contained by the first patch 112. In this way, the modified second patch 414 may comprise gaps at frequencies already contained by the first patch 112.

In this example, the combiner 120 combines the first patch 112, the modified second patch 414 and the first band of the input signal 102.

The spectral line selector 410 may be, for example, part of the patch generator 110 (as shown in FIG. 4) or a separate unit.

Figure 5A:
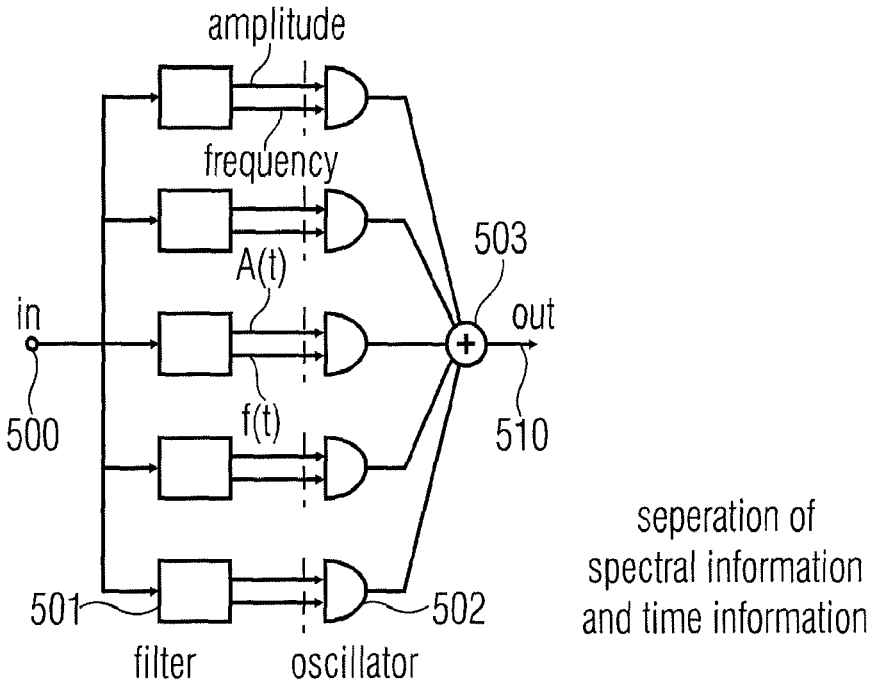
FIG. 5a is a schematic illustration of a filterbank implementation of a phase vocoder.

In the following, with reference to FIGS. 5 and 6, possible implementations for a phase vocoder 310 are illustrated according to the present invention. FIG. 5a shows a filterbank implementation of a phase vocoder, wherein an audio signal is fed to an input 500 and obtained at an output 510. In particular, each channel of the schematic filterbank illustrated in FIG. 5a includes a bandpass filter 501 and a downstream oscillator 502. Output signals of all oscillators from every channel are combined by a combiner, which is, for example, implemented as an adder and indicated at 503 in order to obtain the output signal. Each filter 501 is implemented such that it provides an amplitude signal on the one hand and a frequency signal on the other hand. The amplitude signal and the frequency signal are time signals illustrating a development of the amplitude in a filter 501 over time, while the frequency signal represents a development of the frequency of the signal filtered by a filter 501.

Figure 5B:
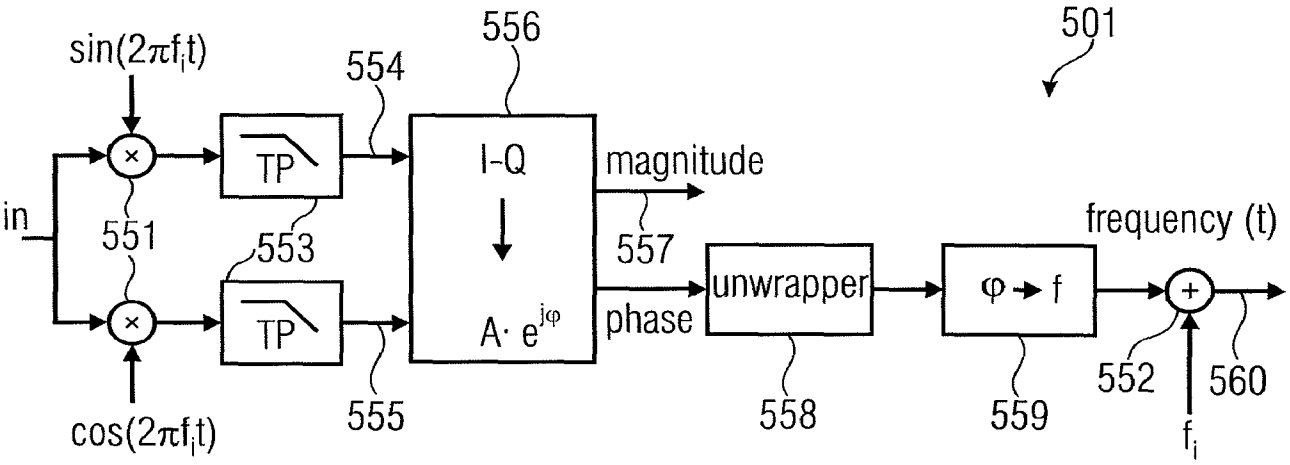

A schematical setup of filter 501 is illustrated in FIG. 5b. Each filter 501 of FIG. 5a may be set up as in FIG. 5b, wherein, however, only the frequencies f, supplied to the two input mixers 551 and the adder 552 are different from channel to channel. The mixer output signals of the mixers 551 are both lowpass filtered by lowpasses 553, wherein the lowpass signals are different insofar as they were generated by local oscillator frequencies (LO frequencies), which are out of phase by 90°. The upper lowpass filter 553 provides a quadrature signal 554, while the lower filter 553 provides an in-phase signal 555. These two signals, i.e. Q, and I are supplied to a coordinate transformer 556 which generates a magnitude phase representation from the rectangular representation. The magnitude signal or amplitude signal, respectively, of FIG. 5a over time is output at an output 557. The phase signal is supplied to a phase unwrapper 558. At the output of the element 558, there is no phase value present any more, which is between 0 and 360°, but a phase value, which increases linearly. This "unwrapped" phase value is supplied to a phase/frequency converter 559 which may, for example, be implemented as a simple phase difference calculator, which subtracts a phase of a previous point in time from a phase at a current point in time to obtain a frequency value for the current point in time or any other means for obtaining an approximation of a phase derivative. This frequency value is added to the constant frequency value $f_i$ of the filter channel i to obtain a temporarily varying frequency value at the output 560. The frequency value at the output 560 has a direct component=$f_i$ and an alternating component=the frequency deviation by which a current frequency of the signal in the filter channel deviates from the average frequency $f_i$.

Thus, as illustrated in FIGS. 5a and 5b, the phase vocoder achieves a separation of the spectral information and the temporal information. The spectral information is contained in the special channel or in the frequency $f_i$, which provides the direct portion of the frequency for each channel, while the temporal information is contained in the frequency deviation or the magnitude evolution over time, respectively.

Figure 5C:
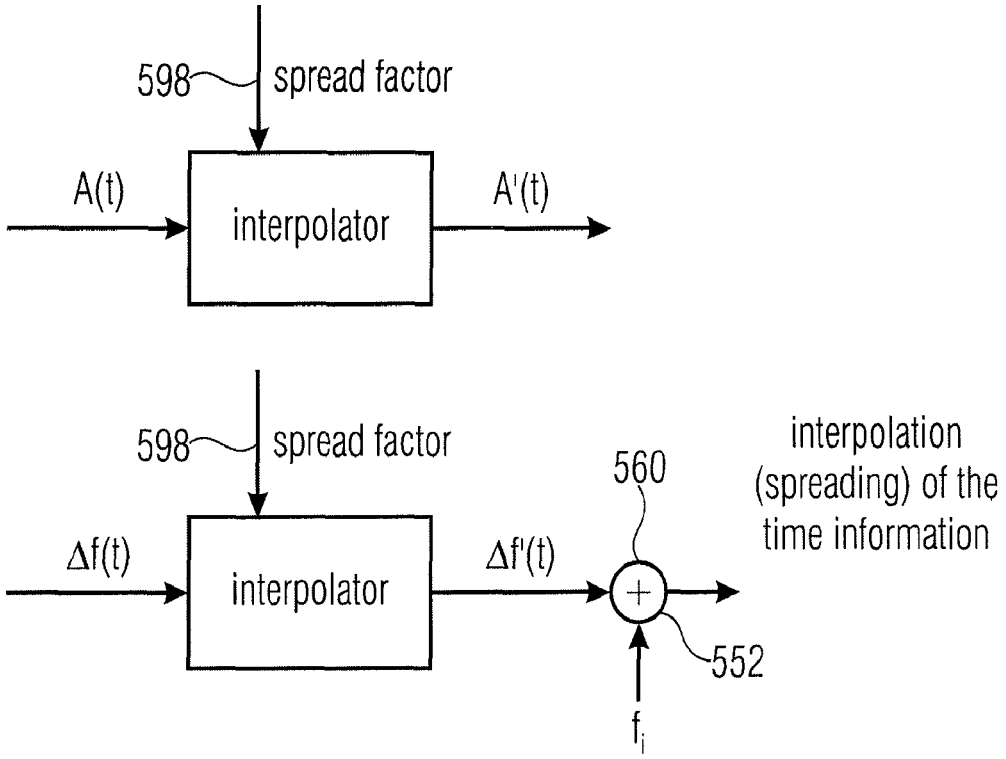

FIG. 5c shows a manipulation as it is executed for the generation of the first patch according to the invention, in particular, using the phase vocoder 310 and, in more detail, inserted at the location of the dashed line of the illustrated circuit in FIG. 5a.

For time scaling, e.g. the amplitude signals A(t) in each channel or the frequency of the signals f(t) in each channel may be decimated or interpolated. For purposes of transposition, as it is useful for the present invention, an interpolation, i.e. a temporal extension or spreading of the signals A(t) and f(t) is performed to obtain spread signals A'(t) and f'(t), wherein the interpolation is controlled by the spreading factor 598. The spreading factor can be selected, for example, so that the phase vocoder generates harmonic frequencies. By the interpolation of the phase variation, i.e. the value before the addition of the constant frequency by the adder 552, the frequency of each individual oscillator 502 in FIG. 5a is not changed. The temporal change of the overall audio signal is slowed down, however, i.e. by the factor 2. The result is a temporally spread tone having the original pitch, i.e. the original fundamental wave with its harmonics.

By performing the signal processing illustrated in FIG. 5c, the audio signal may be shrunk back to its original duration, e.g. by decimation of a factor 2, while all frequencies are doubled simultaneously. This leads to a pitch transposition by the factor 2 wherein, however, an audio signal is obtained which has the same length as the original audio signal, i.e. the same number of samples.

Figure 6:
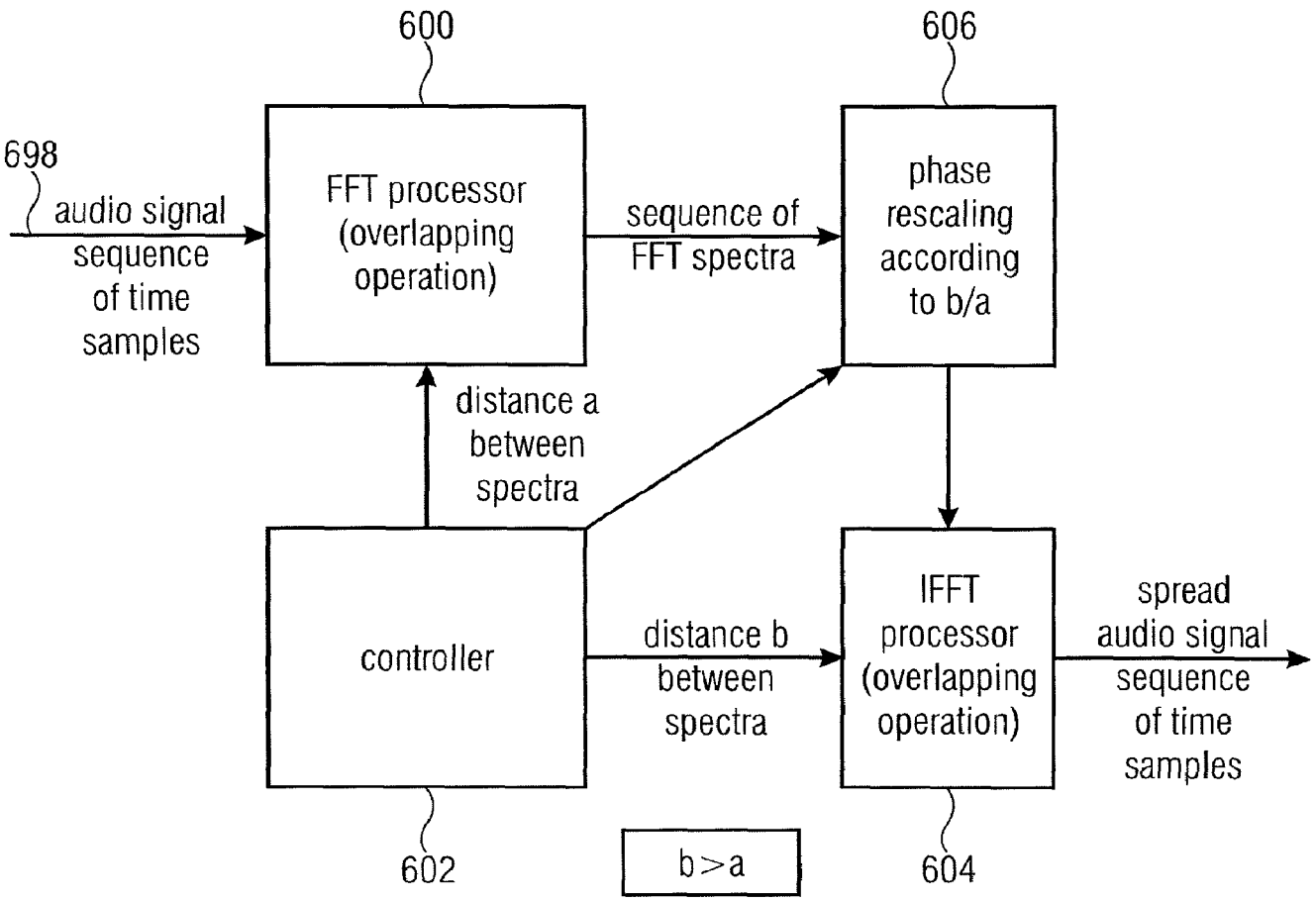
FIG. 6 is a schematic illustration of a transformation implementation of a phase vocoder.

As an alternative to the filterband implementation illustrated in FIG. 5a, a transformation implementation of a phase vocoder may also be used as depicted in FIG. 6. Here, the audio signal 698 is fed into an FFT processor, or more generally, into a Short-Time-Fourier-Transformation (STFT) processor 600 as a sequence of time samples. The FFT processor 600 is implemented to perform a temporal windowing of an audio signal in order to then, by means of an subsequent FFT, calculate both a magnitude spectrum and also a phase spectrum, wherein this calculation is performed for successive spectra which are related to blocks of the audio signal that are strongly overlapping.

In an extreme case, for every new audio signal sample a new spectrum may be calculated, wherein a new spectrum may be calculated also e.g. only for each twentieth new sample. This distance 'a' in samples between two spectra is advantageously given by a controller 602. The controller 602 is further implemented to feed an IFFT processor 604 which is implemented to operate in an overlap-add operation. In particular, the IFFT processor 604 is implemented such that it performs an inverse Short-Time-Fourier-Transformation by performing one IFFT per spectrum based on a magnitude spectrum and a phase spectrum, in order to then perform an overlap-add operation to obtain the resulting time signal. The overlap add operation is configured to eliminate the blocking effects introduced by the analysis window.

A temporal spreading of the time signal is achieved by the distance 'b' between two spectra, as they are processed by the IFFT processor 604, being greater than the distance 'a' between the spectra used in the generation of the FFT spectra. The basic idea is to spread the audio signal by the inverse FFTs simply being spaced further apart than the analysis FFTs. As a result, spectral changes in the synthesized audio signal occur more slowly than in the original audio signal.

Without a phase rescaling in block 606, this would, however, lead to frequency artifacts. When, for example, one single frequency bin is considered for which successive phase values by 45° are implemented, this implies that the signal within this filterband increases in the phase with a rate of ⅛ of a cycle, i.e. by 45° per time interval, wherein the time interval here is the time interval between successive FFTs. If now the inverse FFTs are being spaced farther apart from each other, this means that the 45° phase increase occurs across a longer time interval. This means that the frequency of this signal portion was unintentionally modified. To eliminate this artifact, the phase is rescaled by exactly the same factor by which the audio signal was spread in time. The phase of each FFT spectral value is thus increased by the factor b/a, so that this unintentional frequency modification is eliminated.

While in the embodiment illustrated in FIG. 5c the spreading by interpolation of the amplitude/frequency control signals was achieved for one signal oscillator in the filterbank implementation of FIG. 5a, the spreading in FIG. 6 is achieved by the distance between two IFFT spectra being greater than the distance between two FFT spectra, i.e. 'b' being greater than 'a', wherein, however, for an artifact prevention a phase rescaling is executed according to the ratio 'b/a'. The distance 'b' can be selected, for example, so that the phase vocoder generates harmonic frequencies.

Figure 7:
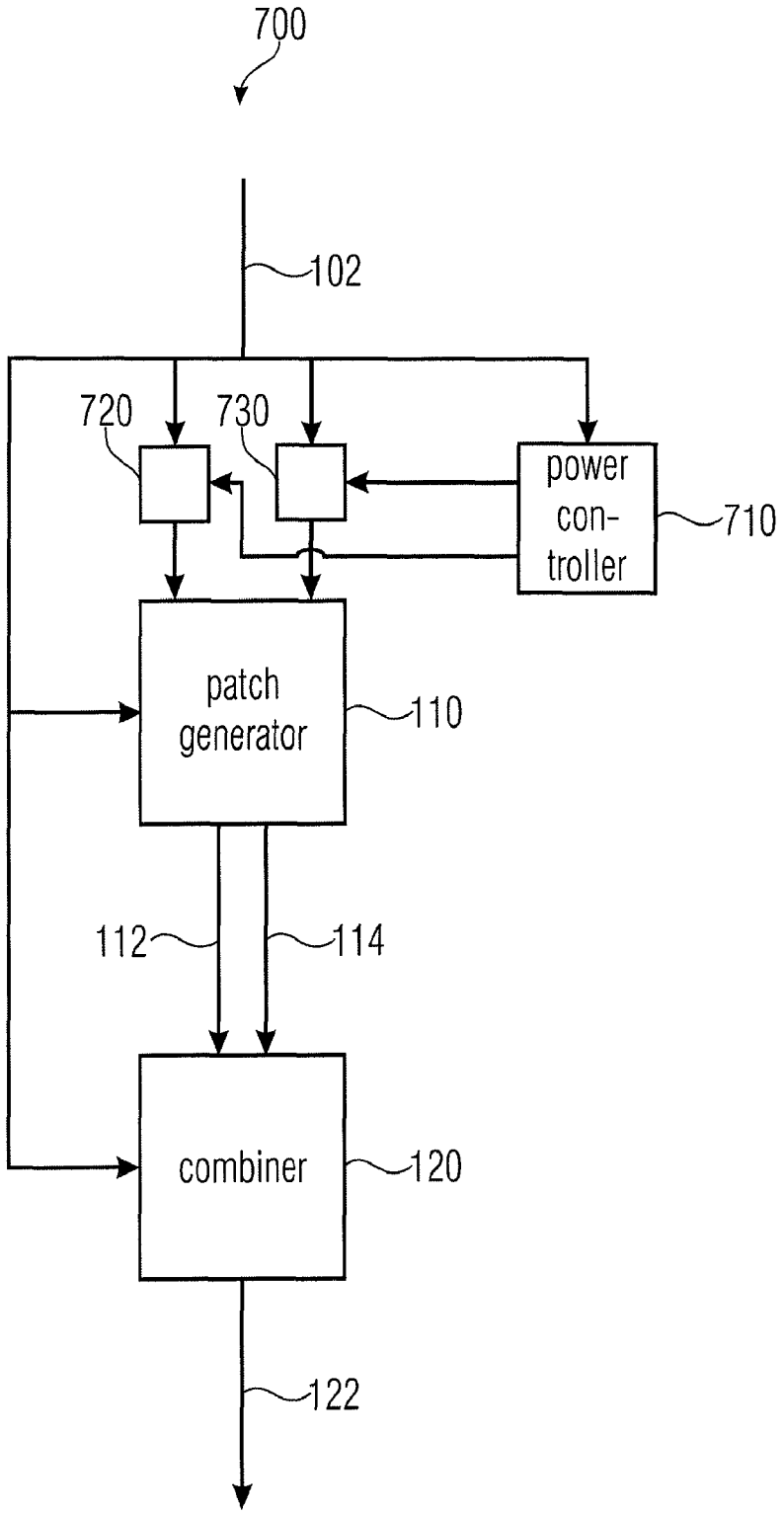
FIG. 7 is a block diagram of an apparatus for generating a bandwidth extended signal from an input signal.

FIG. 7 shows a block diagram of an apparatus 700 for generating a bandwidth extended signal 122 from an input signal 102 according to an embodiment of the invention. The apparatus 700 is similar to the apparatus shown in FIG. 1, but comprises a power controller 710, a first power adjustment means 720 and a second power adjustment means 730. The power controller 710 is connected to the first power adjustment means 720 and to the second power adjustment means 730. The first power adjustment means 720 and the second power adjustment means 730 are connected to the patch generator 110. The power controller 710 may control the scaling of the input signal according to the first and the second patching algorithm based on spectral envelope data contained by the input signal and based on patch scaling control data contained by the input signal. Alternatively, instead of the patch scaling control data contained by the input signal, at least one stored patch-scaling control parameter may be used. A patch scaling control parameter may be stored by a patch-scaling control parameter memory, which may be part of the power controller 710 or a separate unit. The first power adjustment means 720 may scale the input signal 102 according to the first patching algorithm and the second power adjustment means 730 may scale the input signal 102 according to the second patching algorithm. In other words, the input signal 102 may be pre-processed, so that the first and the second patch can be generated, so that the bandwidth extended signal fulfills the spectral envelope criterion. For this, the spectral envelope data may define the spectral envelope of the bandwidth extended signal 122 and the patch scaling control data or patch scaling control parameter may set the ratio between the first patch 112 and the second patch 114 or may set the absolute values of the first patch 112 and/or the second patch 114. The first power adjustment means 720 and the second power adjustment means 730 may be part of the power controller 710 or separate units as shown in FIG. 7. The power controller 710 may be part of the patch generator 110 or a separate unit as also shown in FIG. 7. The power adjustment means 720, 730 may be, for example, amplifiers or filters controlled by the power controller 710.

Figure 8:
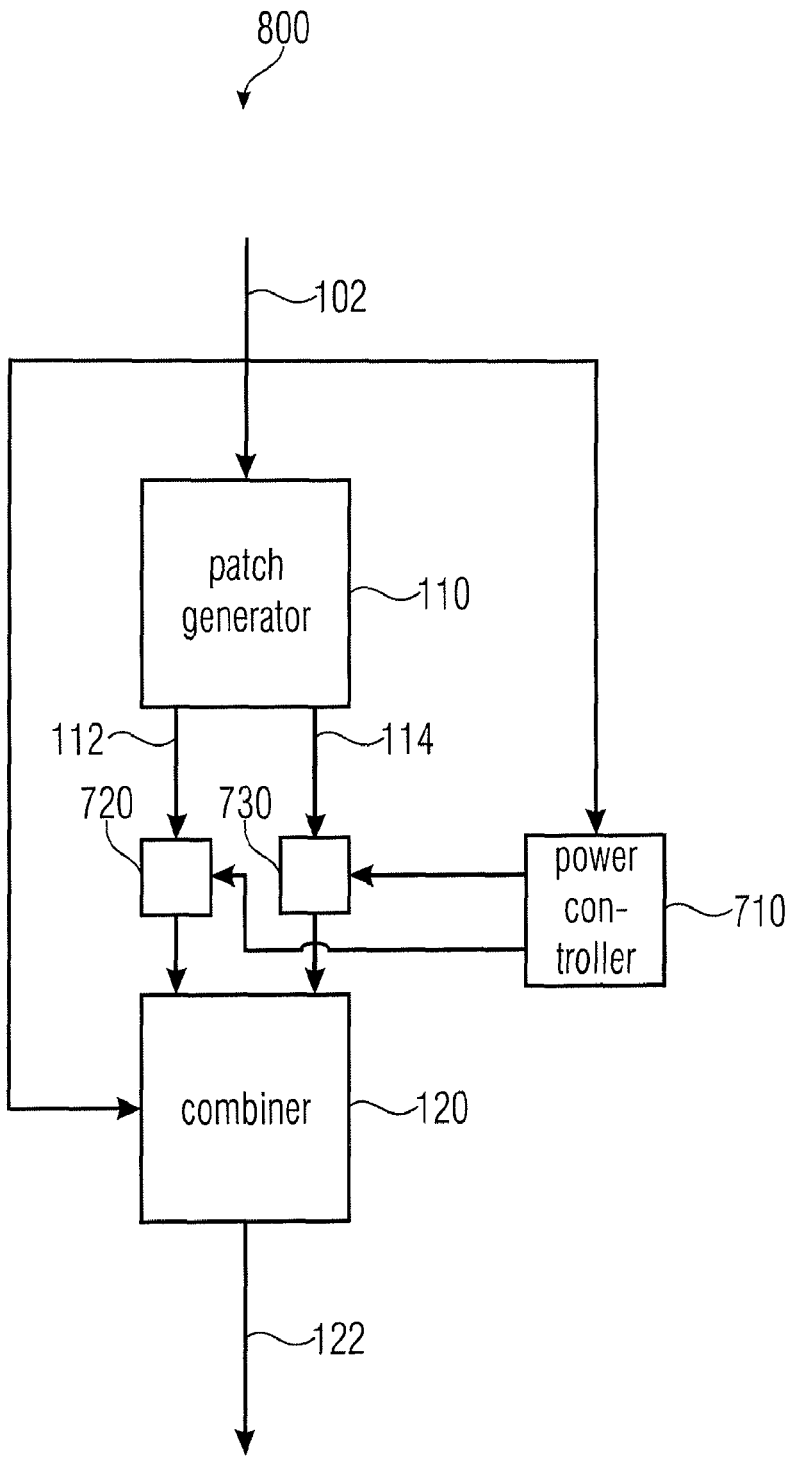
FIG. 8 is a block diagram of an apparatus for generating a bandwidth extended signal from an input signal.

Alternatively, the scaling is done after generation of the patches. Fittingly, FIG. 8 shows a block diagram of an apparatus 800 for generating a bandwidth extended signal 122 from an input signal 102 according to an embodiment of the invention. The apparatus 800 is similar to the apparatus shown in FIG. 7, but the power adjustment means 720, 730 are arranged between the patch generator 110 and the combiner 120. In this example, the patch generator 110 is connected to the first power adjustment means 720 and connected to the second power adjustment means 730. The first power adjustment means 720 and the second power adjustment means 730 are connected to the combiner 120. In this way, the first patch 112 can be scaled by the first power adjustment means 720 according to the first patching algorithm and the second patch 114 can be scaled by the second power adjustment means 730 according to the second patching algorithm. The power adjustment means are, again, controlled by the power controller 710 based on the spectral envelope data and the patch scaling control data or the patch scaling control parameter as described before.

Alternatively, also a scaling or power adjustment of only one of the both patches followed by combining the patches by the combiner 120 and scaling the combined patches before combining the combined patches with the first band of the input signal 102 may be possible. In other words, first one patch may be scaled to realize a predefined ratio (for example, based on the patch scaling control data) between the two patches and then the combined patches are scaled (for example, based on the spectral envelope data) to fulfill the spectral envelope criterion.

The patch scaling control data may comprise, for example, a simple factor or a plurality of parameters for a power distribution scaling. The patch scaling control data may indicate, for example, a power ratio between the first patch and the second patch over the full second band or full high frequency band or an absolute value for the power of the first patch and/or the second patch over the full second band or full high band and may be represented by at least one parameter. Alternatively, the patch scaling data comprises a factor for each of a plurality of subbands together constituting the second band or high frequency band, e.g. similar to the spectral envelope data per subband in spectral bandwidth replication applications. Alternatively, the patch scaling data may also indicate a transfer function of a filter. For example, parameters of a transfer function of a filter for scaling the first patch and/or parameters of a transfer function of a filter for scaling the second patch may be contained in the input signal. In this way, the parameters may represent a function of frequency. Another alternative may be patch scaling control parameters representing a differential function of the first patch and the second patch. According to this examples, the scaling of the input signal or the scaling of the first patch and the second patch may be based on the patch scaling control data comprising at least one parameter.

Figure 9:
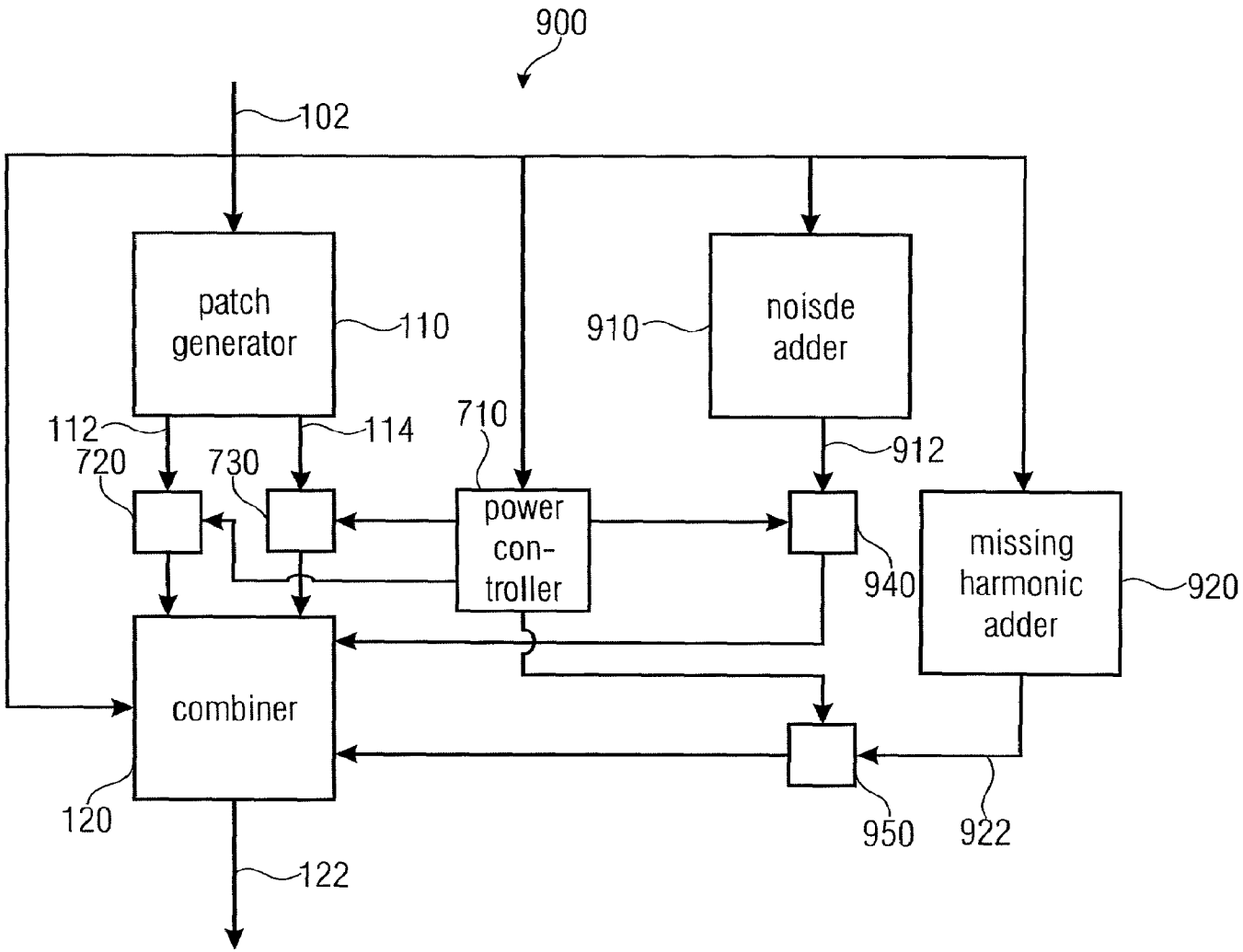
FIG. 9 is a block diagram of an apparatus for generating a bandwidth extended signal from an input signal.

FIG. 9 shows a block diagram of an apparatus 900 for generating a bandwidth extended signal 122 from an input signal 102 according to an embodiment of the invention. The apparatus 900 is similar to the apparatus shown in FIG. 8, but comprises additionally a noise adder 910, a missing harmonic adder 920, a noise power adjustment means 940 and a missing harmonic power adjustment means 950. The noise adder 910 is connected to the noise power adjustment means 940, which is connected to the combiner 120. The missing harmonic adder 920 is connected to the missing harmonic power adjustment means 950, which is connected to the combiner 120. Further, the power controller 710 is connected to the noise power adjustment means 940 and the missing harmonic power adjustment means 950. The noise adder 910 may generate a noise patch 912 based on a noise data contained by the input signal 102.

The noise patch 912 may be scaled by the noise power adjustment means 940. The power controller 710 may control the noise power adjustment means 940 based on the spectral envelope data and/or noise scaling data contained in the input signal 102. In this way, the noise of an original signal may be approximated to improve the audio quality of the bandwidth extended signal.

The missing harmonic adder 920 may generate a missing harmonic patch 922 based on a missing harmonic data contained in the input signal. The missing harmonic patch 922 may contain harmonic frequencies, which may only occur in the high frequency band of the original signal and, therefore, cannot be reproduced, if only the information of the low frequency band of the original signal in terms of the first band of the input signal 102 is available. The missing harmonic data may provide information about these missing harmonics. The missing harmonic patch 922 may be scaled by the missing harmonic power adjustment means 950. The power controller 710 may control the missing harmonic power adjustment means 950 based on the spectral envelope data or based on a missing harmonic scaling data contained by the input signal 102.

The combiner 120 may combine the first patch 112, the second patch 114, the first band of the input signal 102, the noise patch 912 and the missing harmonic patch 922 to obtain the bandwidth extended signal 122. The power controller 710, in combination with the power adjustment means, may scale the first patch 112, the second patch 114, the noise patch 912 and the missing harmonic patch 922 based on the spectral envelope data, so that the spectral envelope criterion is fulfilled.

Figure 10:
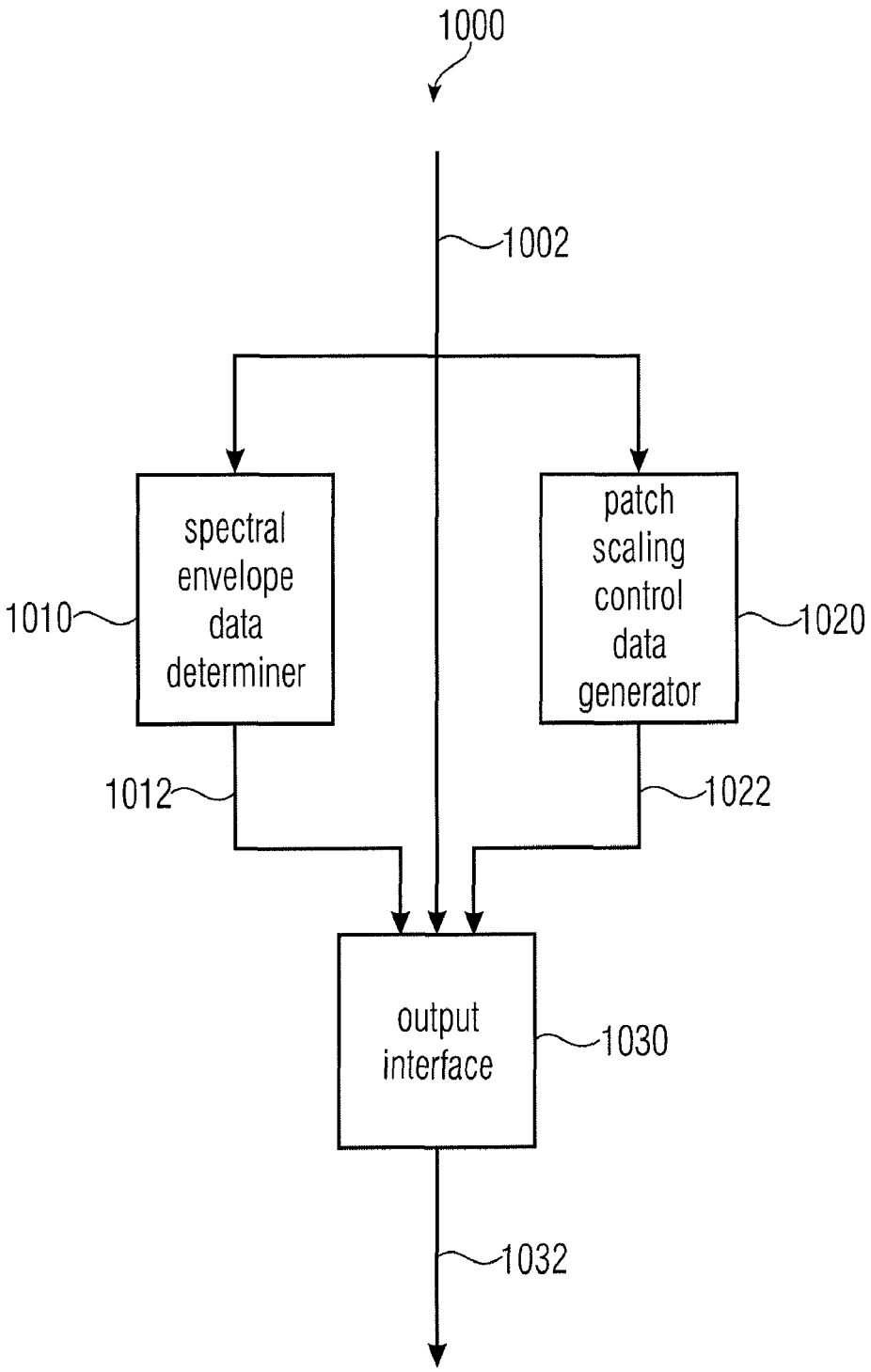
FIG. 10 is a block diagram of an apparatus for providing a bandwidth reduced signal based on an input signal.

FIG. 10 shows a block diagram of an apparatus 1000 for providing a bandwidth reduced signal 1032 based on an input signal 1002 according to an embodiment of the invention. The apparatus 1000 comprises a spectral envelope data determiner 1010, a patch scaling control data generator 1020 and an output interface 1030. The spectral envelope data determiner 1010 and the patch scaling control data generator 1020 are connected to the output interface 1030. The spectral envelope data determiner 1010 may determine spectral envelope data 1012 based on a high frequency band of the input signal 1002. The patch scaling control data generator 1020 may generate patch scaling control data 1022 for scaling the bandwidth reduced signal 1032 at a decoder or for scaling a first patch and a second patch by the decoder so that a bandwidth extended signal generated by the decoder fulfills a spectral envelope criterion. The spectral envelope criterion is based on the spectral envelope data. The first patch is generated from a first band of the bandwidth reduced signal 1032 according to a first patching algorithm and the second patch is generated from the first band of the bandwidth reduced signal 1032 according to a second patching algorithm. A spectral density of the second patch generated according to the second patching algorithm is higher than a spectral density of the first patch generated according to the first patching algorithm. The output interface 1030 combines a low frequency band of the input signal 1002, the spectral envelope data 1012 and the patch scaling control data 1022 to obtain the bandwidth reduced signal 1032. Further, the output interface 1030 provides the bandwidth reduced signal 1032 for transmission or storage.

The apparatus 1000 may also comprise a core coder for encoding the low frequency band of the input signal. The core encoder may be, for example, a differential encoder, an entropy encoder or a perceptual audio encoder.

The apparatus 1000 may be part of an encoder configured to provide a signal for a decoder described above. The patch scaling control data 1022 may comprise, for example, a simple factor or a plurality of parameters for a power distribution scaling. The patch scaling control data may indicate, for example, a power ratio between the first patch and the second patch over the full high frequency band or an absolute value for the power of the first patch and/or the second patch over the full high frequency band and may be represented by at least one parameter. Alternatively, the patch scaling data comprises a factor determined for each of a plurality of subbands together constituting the high frequency band, e.g. similar to the spectral envelope data per subband in spectral bandwidth replication applications. Alternatively the patch scaling data may also indicate a transfer function of a filter. For example, parameters of a transfer function of a filter for scaling the first patch and/or parameters of a transfer function of a filter for scaling the second patch may be determined for generating the patch scaling control data. In this way, the parameters may be generated based on a function of frequency. Another alternative may be generating patch scaling control parameters representing a differential function of the first patch and the second patch.

The patch scaling control data 1022 may be generated by analyzing the input signal 1002 and selecting patch scaling control parameters stored in a patch scaling control parameter memory based on the analysis of the input signal 1002 to obtain the patch scaling control data 1022.

Alternatively, the generation of the patch scaling control data 1022 may be realized by an analysis by synthesis approach. For this, the patch scaling control data generator 1020 may comprise additionally a patch generator (as described for the decoder) and a comparator. The patch generator may generate a first patch from the low frequency band of the input signal 1002 according to a first patching algorithm and a second patch from the low frequency band of the input signal 1002 according to a second patching algorithm. A spectral density of the second patch generated according to the second patching algorithm may be higher than a spectral density of the first patch generated according to the first patching algorithm. The comparator may compare the first patch, the second patch and the high frequency band of the input signal to obtain the patch scaling control data 1022. In other words, the concept described before is also applied to the apparatus 1000. In this way, the apparatus 1000 may extract the patch scaling control data 1022 by comparing the patches or the combined patches with the input signal, which may, for example, be an original audio signal. Additionally, the apparatus 1000 may also comprise a spectral line selector, a power controller, a noise adder and/or a missing harmonic adder as described before. In this way, also the noise data, the noise patch scaling control data, the missing harmonic data and/or the missing harmonic patch scaling control data may be extracted by an analysis by synthesis approach.

Some embodiments according to the invention relate to an audio signal comprising a first band and a second band. The first band is represented by a first resolution data and the second band is represented by a second resolution data, wherein the second resolution is lower than the first resolution. The second resolution data is based on spectral envelope data of the second band and patch scaling control data of the second band for scaling the audio signal at a decoder or for scaling a first patch and a second patch by the decoder, so that a bandwidth extended signal generated by the decoder fulfills a spectral envelope criterion. The spectral envelope criterion is based on the spectral envelope data. The first patch is generated from the first band of the audio signal according to a first patching algorithm and the second patch is generated from the first band of the audio signal according to a second patching algorithm. A spectral density of the second patch generated according to the second patching algorithm is higher than a spectral density of the first patch generated according to the first patching algorithm.

The audio signal may be, for example, a bandwidth reduced signal based on an original audio signal. The first band of the audio signal may represent a low frequency band of the original audio signal encoded with high resolution. The second band of the audio signal may represent a high frequency band of the original audio signal and may be quantized at least by two parameters, a spectral envelope parameter represented by the spectral envelope data and a patch scaling control parameter represented by the patch scaling control data. Based on such an audio signal, a decoder according to the concept described above may generate a bandwidth extended signal providing a good approximation of the original audio signal with improved audio quality in comparison with known concepts.

Figure 11:
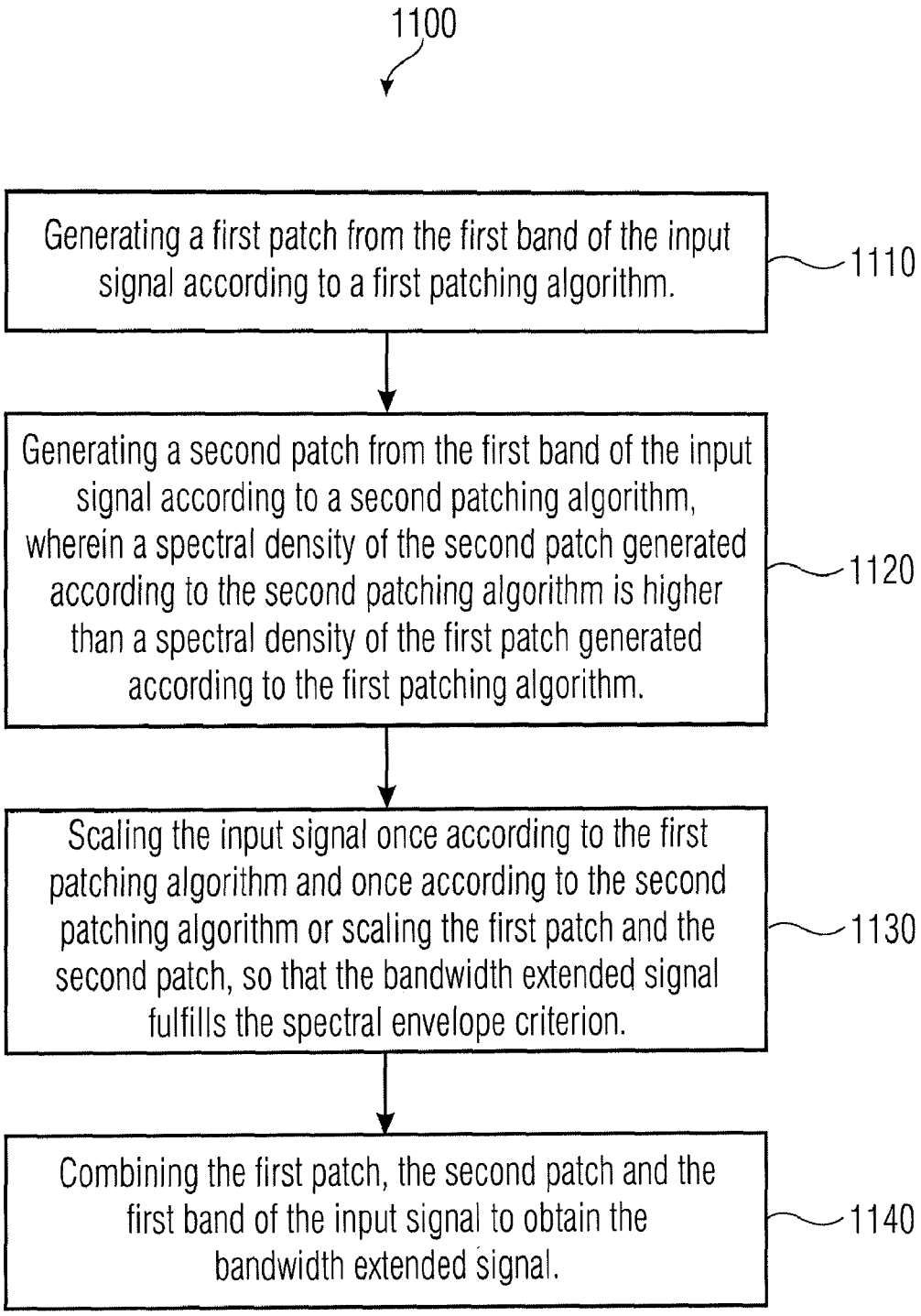
FIG. 11 is a flow chart of a method for generating a bandwidth extended signal from an input signal.

FIG. 11 shows a flow chart of a method 1100 for generating a bandwidth extended signal from an input signal according to an embodiment of the invention. The input signal is represented, for a first band by a first resolution data, and for a second band by a second resolution data, the second resolution being lower than the first resolution. The method 1100 comprises generating 1110 a first patch, generating 1120 a second patch, scaling 1130 the input signal or scaling 1130 the first patch and the second patch and combining 1140 the first patch, the second patch and the first band of the input signal to obtain the bandwidth extended signal. The first patch is generated 1110 from the first band of the input signal according to a first patching algorithm and the second band is generated 1120 from the first band of the input signal according to a second patching algorithm. A spectral density of the second patch generated 1120 according to the second patching algorithm is higher than a spectral density of the first patch generated 1110 according to the first patching algorithm. The input signal may be scaled 1130 according to the first patching algorithm and according to the second patching algorithm or the first patch and the second patch may be scaled 1130, so that the bandwidth extended signal fulfills a spectral envelope criterion.

Further, the method 1100 may be extended by steps according to the concept described above. The method 1100 may be, for example, realized as a computer program for running on a computer or micro controller.

Figure 12:
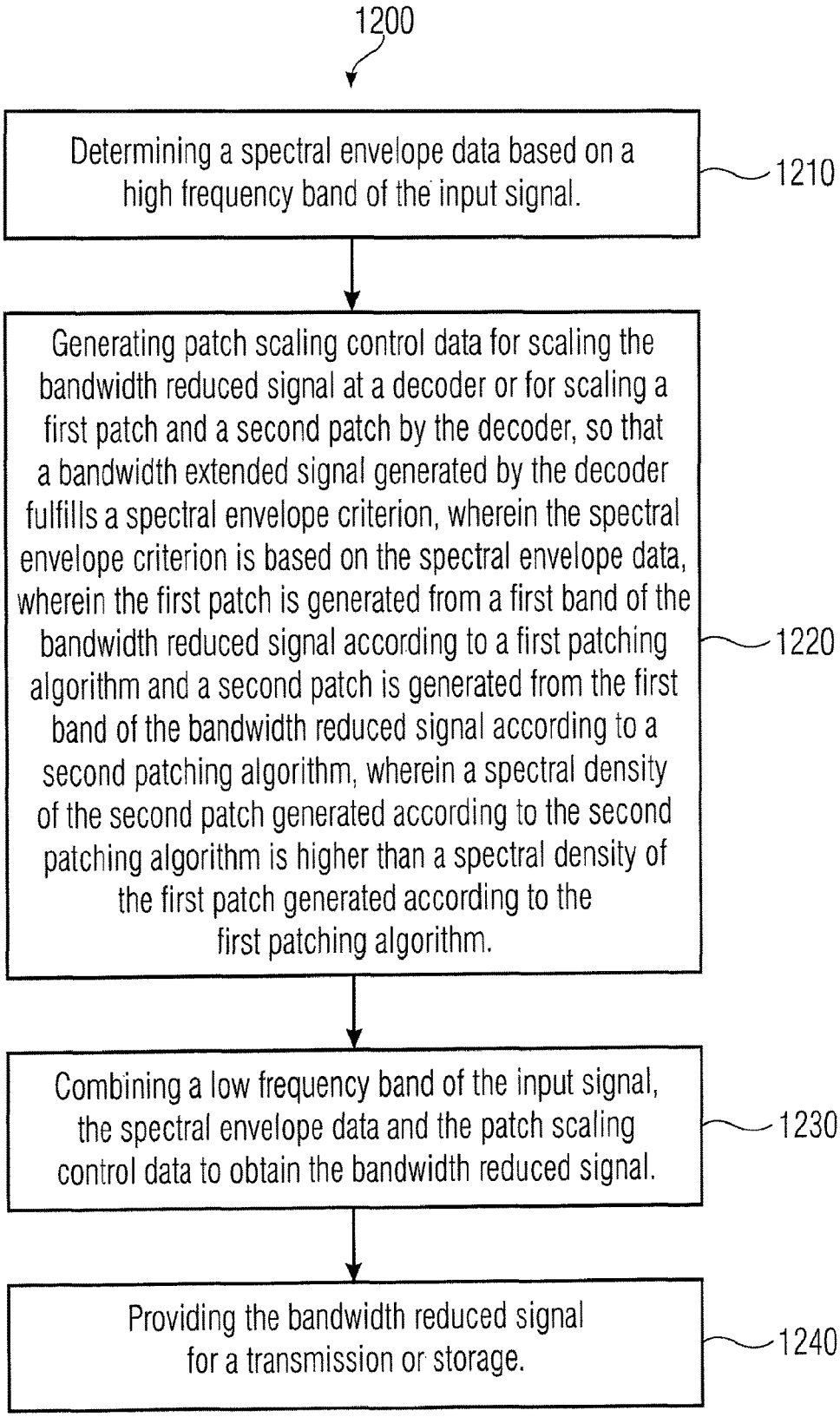
FIG. 12 is a flow chart of a method for providing a bandwidth reduced signal based on an input signal.
Figure 13:
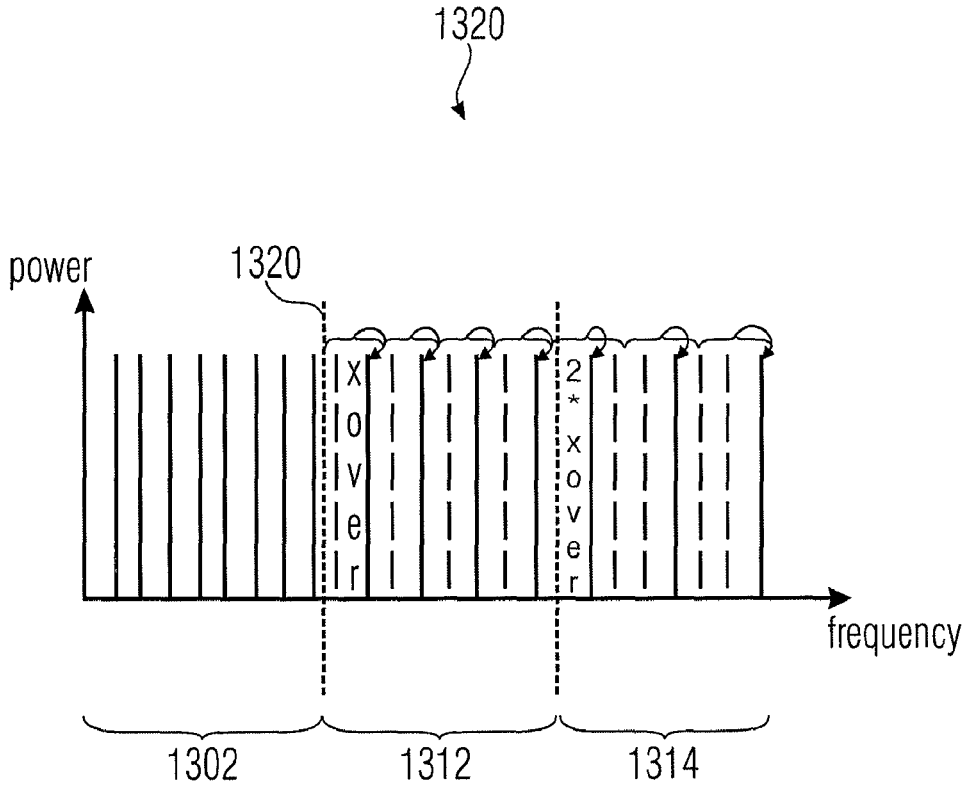
FIG. 13 is a schematic illustration of a known bandwidth extension algorithm.

FIG. 12 shows a flow chart of a method 1200 for providing a bandwidth reduced signal based on an input signal according to an embodiment of the invention. The method 1200 comprises determining 1210 spectral envelope data based on a high frequency band of the input signal, generating 1220 patch scaling control data, combining 1230 a low frequency band of the input signal, the spectral envelope data and the patch scaling control data to obtain the bandwidth reduced signal and providing 1240 the bandwidth reduced signal for transmission or storage. The patch scaling control data is generated 1220 for scaling the bandwidth reduced signal at a decoder or for scaling a first patch and a second patch by the decoder so that a bandwidth extended signal generated by the decoder fulfills a spectral envelope criterion. The spectral envelope criterion is based on the spectral envelope data. The first patch is generated from a low frequency band of the bandwidth reduced signal according to a first patching algorithm and the second patch is generated from the low frequency band of the bandwidth reduced signal according to a second patching algorithm. A spectral density of the second patch generated according to the second patching algorithm is higher than a spectral density of the first patch generated according to the first patching algorithm.

Further, the method 1200 may be extended by steps according to the concept described above. The method 1200 may be, for example, realized as a computer program for running on a computer or micro controller.

Some embodiments according to the invention relate to an apparatus for generating a bandwidth extended signal using a phase vocoder for bandwidth extension combined with non-linear distortion or noise-filling for a more dense spectrum. When applying the phase vocoder for spectral spreading, frequency lines move further apart. If gaps exist in the spectrum, e.g. by quantization, the same are even increased by the spreading. In an energy adaptation, remaining lines in the spectrum receive too much energy. This is prevented by filling the gaps, either by noise or by further harmonics, which may be gained by a non-linear distortion of the signal. This way, more energy may be distributed between the remaining lines. By the concentration of the energy in bands to only few frequency lines, a unnatural or metallic sound results. The energy of formerly more bands is summed up to the remaining ones.

If there are no gaps in the spectrum, but—at least—noise is present, a part of the energy remains in the noise floor. By application of non-linear distortion, the spectrum may be densified again on the one hand by noise produced by the distortion, on the other hand by further harmonic portions steered by an appropriate selection of the signal portion to be distorted.

The bandwidth extended signal then may be, for example, a weighted sum of a filtered distorted signal and a signal, which was generated with the help of the phase vocoder. In other words, the bandwidth extended signal may be a weighted sum of the first patch, the second patch and the first band of the input signal.

Some embodiments according to the invention relate to a concept suitable for all audio applications where the full bandwidth is not available. For example, for the broadcast of audio contents using digital radio services, internet streaming or other audio communication applications, the described concept may be applied.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

[1. An apparatus for generating a bandwidth extended signal from an input signal, wherein the input signal is represented, for a first band by a first resolution data, and for a second band by a second resolution data, the second resolution being lower than the first resolution, the apparatus comprising:

a patch generator configured to generate a first patch from the first band of the input signal according to a first patching algorithm and configured to generate a second patch from the first band of the input signal according to a second patching algorithm, wherein a spectral density of the second patch generated according to the second patching algorithm is higher than a spectral density of the first patch generated according to the first patching algorithm; and a combiner configured to combine the first patch, the second patch and the first band of the input signal to acquire the bandwidth extended signal, wherein the apparatus for generating a bandwidth extended signal is configured to scale the input signal according to the first patching algorithm and according to the second patching algorithm or to scale the first patch and the second patch, or to scale only one of the first and second patches to obtain a scaled patch, to then combine the scaled patch and a non-scaled patch from the first and second patches to obtain combined patches, and to then scale the combined patches before combining the combined patches with the first band of the input signal, so that the bandwidth extended signal fulfills a spectral envelope criterion.]

[2. The apparatus according to claim 1, wherein the first patching algorithm is a harmonic patching algorithm and the patch generator is configured to generate the first patch, so that only frequencies that are integer multiples of frequencies of the first band of the input signal are comprised by the first patch.]

[3. The apparatus according to claim 1, wherein the second patching algorithm is a mixing patching algorithm and the patch generator is configured to generate the second patch, so that the second patch comprises frequencies that are integer multiples of frequencies of the first band of the input signal and comprises frequencies that are not integer multiples of frequencies of the first band of the input signal.]

[4. The apparatus according to claim 1, wherein a lower cut-off frequency of the first patch is equal to a lower cut-off frequency of the second patch, and wherein an upper cut-off frequency of the first patch is equal to an upper cut-off frequency of the second patch.]

[5. The apparatus according to claim 1, comprising a phase vocoder configured to generate the first patch according to the first patching algorithm.]

[6. The apparatus according to claim 1, comprising an amplitude clipper configured to generate the second patch according to the second patching algorithm by clipping the first band of the input signal.]

[7. The apparatus according to claim 1, comprising a spectral line selector configured to select a plurality of frequency lines of the second patch to acquire a modified second patch, wherein a frequency line is selected, if a corresponding frequency line of the first patch is missing, wherein the combiner is configured to combine the first patch, the modified second patch and the first band of the input signal.]

[8. The apparatus according to claim 1, comprising a power controller configured to control the scaling of the input signal according to the first and the second patching algorithm or configured to control the scaling of the first patch and the second patch, wherein the power controller controls the scaling based on spectral envelope data comprised by the input signal and based on at least one stored patch scaling control parameter or patch scaling control data comprised by the input signal.]

[9. The apparatus according to claim 8, comprising a first power adjuster configured to scale the input signal according to the first patching algorithm or to scale the first patch, and comprising a second power adjuster configured to scale the input signal according to the second patching algorithm or to scale the second patch, wherein the power controller is configured to control the first power adjuster and the second power adjuster.]

[10. The apparatus according to claim 8, comprising a noise adder and a missing harmonic adder, wherein the noise adder is configured to generate a noise patch based on a noise data comprised by the input signal, wherein the missing harmonic adder is configured to generate a missing harmonic patch based on a missing harmonic data comprised by the input signal, wherein the power controller is configured to control a scaling of the noise patch and the missing harmonic patch based on the spectral envelope data, and wherein the combiner is configured to combine the first patch, the second patch, the first band of the input signal, the noise patch and the missing harmonic patch to acquire the bandwidth extended signal, wherein the power controller controls the scaling of the first patch, the second patch, the noise patch and the missing harmonic patch based on the spectral envelope data, so that the spectral envelope criterion is fulfilled.]

[11. An apparatus for providing a bandwidth reduced signal based on an input signal, comprising:

a spectral envelope data determiner configured to determine spectral envelope data based on a high-frequency band of the input signal;

a patch scaling control data generator configured to generate patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data wherein the first patch is generated from a first band of the bandwidth reduced signal according to a first patching algorithm and the second patch is generated from the first band of the bandwidth reduced signal according to a second patching algorithm, wherein a spectral density of the second patch generated according to the second patching algorithm is higher than a spectral density of the first patch generated according to the first patching algorithm;

an output interface configured to combine a low frequency band of the input signal, the spectral envelope data and the patch scaling control data to acquire the bandwidth reduced signal and configured to provide the bandwidth reduced signal for transmission or storage.]

[12. The apparatus according to claim 11, wherein the patch scaling control data generator comprises:

the patch generator configured to generate a first patch from the low frequency band of the input signal according to a first patching algorithm and configured to generate a second patch from the low frequency band of the input signal according to a second patching algorithm, wherein a spectral density of the second patch generated according to the second patching algorithm is higher than the spectral density of the first patch generated according to the first patching algorithms; and a comparator configured to compare the first patch, the second patch and the high frequency band of the input signal to acquire the patch scaling control data.]

[13. The apparatus according to claim 11, comprising a patch scaling control parameter memory configured to store and provide a plurality of patch scaling control parameters, wherein the patch scaling control data generator is configured to analyze the input signal and configured to generate the patch scaling control data based on stored patch scaling control parameters selected based on the analysis of the input signal.]

[14. A method for generating a bandwidth extended signal from an input signal, wherein the input signal is represented, for a first band by a first resolution data, and for a second band by a second resolution data, the second resolution being lower than the first resolution, the method comprising:

generating a first patch from the first band of the input signal according to a first patching algorithm;

generating a second patch from the first band of the input signal according to a second patching algorithm, wherein a spectral density of the second patch generated according to the second patching algorithm is higher than a spectral density of the first patch generated according to the first patching algorithm;

scaling the input signal according to the first patching algorithm and according to the second patching algorithm or scaling the first patch and the second patch, so that the bandwidth extended signal fulfills the spectral envelope criterion or scaling only one of the first and second patches to obtain a scaled patch, and then combining the scaled patch and a non-scaled patch from the first and second patches to obtain combined patches, and then scaling the combined patches before combining the combined patches with the first band of the input signal; and combining the first patch, the second patch or the combined patches and the first band of the input signal to acquire the bandwidth extended signal.]

[15. A method for providing a bandwidth reduced signal based on an input signal, comprising:

determining a spectral envelope data based on a high frequency band of the input signal;

generating patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data, wherein the first patch is generated from a first band of the bandwidth reduced signal according to a first patching algorithm and a second patch is generated from the first band of the bandwidth reduced signal according to a second patching algorithm, wherein a spectral density of the second patch generated according to the second patching algorithm is higher than a spectral density of the first patch generated according to the first patching algorithm;

combining a low frequency band of the input signal, the spectral envelope data and the patch scaling control data to acquire the bandwidth reduced signal;

providing the bandwidth reduced signal for a transmission or storage.]

[16. A non-transitory storage medium having stored thereon a computer program with a program code for performing the method for generating a bandwidth extended signal from an input signal, wherein the input signal is represented, for a first band by a first resolution data, and for a second band by a second resolution data, the second resolution being lower than the first resolution, the method comprising:

generating a first patch from the first band of the input signal according to a first patching algorithm;

generating a second patch from the first band of the input signal according to a second patching algorithm, wherein a spectral density of the second patch generated according to the second patching algorithm is higher than a spectral density of the first patch generated according to the first patching algorithm;

scaling the input signal according to the first patching algorithm and according to the second patching algorithm or scaling the first patch and the second patch, so that the bandwidth extended signal fulfills the spectral envelope criterion or scaling only one of the first and second patches to obtain a scaled patch, and then combining the scaled patch and a non-scaled patch from the first and second patches to obtain combined patches, and then scaling the combined patches before combining the combined patches with the first band of the input signal; and combining the first patch, the second patch or the combined patches and the first band of the input signal to acquire the bandwidth extended signal, when the computer program runs on a computer or a microcontroller.]

[17. A non-transitory storage medium having stored thereon a computer program with a program code for performing the method for providing a bandwidth reduced signal based on an input signal, the method comprising:

determining a spectral envelope data based on a high frequency band of the input signal;

generating patch scaling control data for scaling the bandwidth reduced signal at a decoder or for scaling a first patch and a second patch by the decoder, so that a bandwidth extended signal generated by the decoder fulfills a spectral envelope criterion, wherein the spectral envelope criterion is based on the spectral envelope data, wherein the first patch is generated from a first band of the bandwidth reduced signal according to a first patching algorithm and a second patch is generated from the first band of the bandwidth reduced signal according to a second patching algorithm, wherein a spectral density of the second patch generated according to the second patching algorithm is higher than a spectral density of the first patch generated according to the first patching algorithm;

combining a low frequency band of the input signal, the spectral envelope data and the patch scaling control data to acquire the bandwidth reduced signal;

providing the bandwidth reduced signal for a transmission or storage, when the computer program runs on a computer or a microcontroller.]

*18. An apparatus for generating a bandwidth extended signal from an input signal, the apparatus comprising:*

*a patch generator configured to generate a first patch based on a first band of the input signal and configured to generate a second patch based on the first band of the input signal, wherein a spectral density of the second patch is higher than a spectral density of the first patch, wherein the input signal has an upper cut-off frequency, and wherein the first band of the input signal comprises first band data having a first resolution, wherein a second band of the input signal comprises second band data having a second resolution, wherein the second resolution is lower than the first resolution, wherein the second band data comprise noise data, and spectral envelope data;*

*a noise adder configured to generate a noise patch based on the noise data contained in the second band data of the input signal;*

*a combiner configured to combine the first band of the input signal, the first patch, the second patch, and the noise patch to acquire the bandwidth extended signal; and*

*a power controller configured to control a scaling of the first patch, the second patch, and the noise patch based on the spectral envelope data contained in the second band data of the input signal, so that a spectral envelope criterion is fulfilled, wherein the spectral envelope criterion is determined based on a spectral envelope of an original signal.*

*19. The apparatus according to claim 18, wherein the second patch is a mixing patch and the patch generator is configured to generate the second patch, so that the second patch comprises frequencies that are integer multiples of frequencies of the first band of the input signal and comprises frequencies that are not integer multiples of frequencies of the first band of the input signal.*

*20. The apparatus according to claim 18, wherein the patch generator is configured to generate at least one of the first patch or the second patch so that a lower cut-off frequency of the first patch is equal to a lower cut-off frequency of the second patch, and so that an upper cut-off frequency of the first patch is equal to an upper cut-off frequency of the second patch.*

*21. The apparatus according to claim 18, wherein the patch generator comprises a phase vocoder configured to generate the first patch.*

*22. The apparatus according to claim 18, wherein the patch generator comprises an amplitude clipper configured to generate the second patch by clipping the first band of the input signal.*

*23. The apparatus according to claim 18,*

*wherein the patch generator is configured to generate an initial second patch based on the first band of the input signal, and*

*wherein the apparatus comprises a spectral line selector configured to select a plurality of frequency lines of the initial second patch to acquire the second patch, wherein the spectral line selector is configured to select a frequency line, if a corresponding frequency line of the first patch is missing.*

*24. The apparatus according to claim 18, comprising:*

*a first power adjuster configured to scale the first patch, and*

*a second power adjuster configured to scale the second patch,*

*wherein the power controller is configured to control the first power adjuster and the second power adjuster.*

*25. The apparatus according to claim 18,*

*wherein the patch generator is configured to generate the first patch so that the first patch comprises gaps in comparison to the first band of the input signal, and wherein the patch generator is configured to generate the second patch so that the second patch comprises only a few gaps or no gaps in comparison to the first band of the input signal.*

*26. The apparatus according to claim 18,*

*wherein the apparatus is configured to scale the first patch and the second patch before or after generation to fulfill the spectral envelope criterion.*

*27. The apparatus according to claim 18, wherein the patch generator is configured to generate the second patch so that gaps in a spectrum of the first patch are filled by the second patch.*

*28. The apparatus according to claim 18, wherein the apparatus is configured to generate the bandwidth extended signal by performing a weighted addition of the second patch and the first patch.*

*29. The apparatus according to claim 18, wherein the apparatus is configured to generate the bandwidth extended signal by performing a weighted addition of the second patch, the first patch and the first band of the input signal.*

*30. A method for generating a bandwidth extended signal from an input signal, the method comprising:*

*generating a first patch based on a first band of the input signal and generating a second patch based on the first band of the input signal, wherein a spectral density of the second patch is higher than a spectral density of the first patch, wherein the input signal has an upper cut-off frequency, and wherein the first band of the input signal comprises first band data having a first resolution, wherein a second band of the input signal comprises second band data having a second resolution, wherein the second resolution is lower than the first resolution, wherein the second band data comprise noise data, and spectral envelope data;*

*generating a noise patch based on the noise data contained in the second band data of the input signal;*

*combining the first band of the input signal, the first patch, the second patch, and the noise patch to acquire the bandwidth extended signal; and*

*controlling a scaling of the first patch, the second patch, and the noise patch based on the spectral envelope data contained in the second band data of the input signal, so that a spectral envelope criterion is fulfilled, wherein the spectral envelope criterion is determined based on a spectral envelope of an original signal.*

*31. A non-transitory storage medium having stored thereon a computer program with a program code for performing a method for generating a bandwidth extended signal from an input signal, when the computer program runs on a computer or a microcontroller, the method comprising:*

*generating a first patch based on a first band of the input signal and generating a second patch based on the first band of the input signal, wherein a spectral density of the second patch is higher than a spectral density of the first patch, wherein the input signal has an upper cut-off frequency, and wherein the first band of the input signal comprises first band data having a first resolution, wherein a second band of the input signal comprises second band data having a second resolution, wherein the second resolution is lower than the first resolution, wherein the second band data comprise noise data, and spectral envelope data;*

*generating a noise patch based on the noise data contained in the second band data of the input signal;*

*combining the first band of the input signal, the first patch, the second patch, and the noise patch to acquire the bandwidth extended signal; and*

*controlling a scaling of the first patch, the second patch, and the noise patch based on the spectral envelope data contained in the second band data of the input signal, so that a spectral envelope criterion is fulfilled, wherein the spectral envelope criterion is determined based on a spectral envelope of an original signal.*

* * * * *